United States Patent
Cherkaoui et al.

(12)

(10) Patent No.: US 6,749,771 B1
(45) Date of Patent: Jun. 15, 2004

(54) COMPOUNDS AS COMPONENTS IN POLYMERIZABLE LIQUID CRYSTALLINE MIXTURES AND LIQUID CRYSTAL POLYMER NETWORKS COMPRISING THEM

(75) Inventors: Zoubair Cherkaoui, Allschwil (CH); Carsten Benecke, Weil am Rhein (DE)

(73) Assignee: Rolic AG, Zug (CH)

( * ) Notice: Subject to any disclaimer, the term of this patent is extended or adjusted under 35 U.S.C. 154(b) by 0 days.

(21) Appl. No.: 09/743,609

(22) PCT Filed: Jul. 14, 1999

(86) PCT No.: PCT/IB99/01287

§ 371 (c)(1),
(2), (4) Date: Jan. 12, 2001

(87) PCT Pub. No.: WO00/04110

PCT Pub. Date: Jan. 27, 2000

(30) Foreign Application Priority Data

Jul. 14, 1998 (GB) .............................. 9815269

(51) Int. Cl.$^7$ .............................. C09K 19/52
(52) U.S. Cl. .................... 252/299.01; 428/1.1; 524/731
(58) Field of Search ........................... 252/299.1, 299.6, 252/299.62, 299.63, 299.65, 299.66, 299.64, 299.67; 524/731; 556/462, 460, 461

(56) References Cited

U.S. PATENT DOCUMENTS

RE35,462 E * 2/1997 Haas et al. ............... 252/299.6

FOREIGN PATENT DOCUMENTS

GB 2 317 186 * 3/1998 ........... C09K/19/40

OTHER PUBLICATIONS

Diaz, F. et al. Synthesis and Characterization fo Twin Mesogens containing Siloxane units as Central Spacers. Liquid Crystals, 1994, vol. 16, No. 1, 105–113 (Jan. 1994).*

Robinson et al., "Preliminary communication Bi–mesogenic organosiloxane liquid crystal materials exhibiting antiferroelectric phases," Liquid Crystals, vol. 23, pp. 309–312 (1997).

Diaz et al., "Synthesis and characterization of twin mesogens containing siloxane units as central spacers," Liquid Crystals, vol. 16, pp. 105–113 (1994).

Coles et al., "New low molar mass organosiloxanes with unusual ferroelectric properties," Liquid Crystals, vol. 15, pp. 739–744 (1993).

Corsellis et al., "Structural characterization of mono– and di–mesogenic organosiloxanes: The impact of siloxane content on biphenyl benzoate systems," Liquid Crystals, vol. 23, pp. 235–239 (1997).

Ozcayir et al., "Mesomorphic Properties of Main Chain Thermotropic PLCs and Model Compounds Containing a Tetramethyldisiloxane Moiety in the Spacer," Molecular Crystals and Liquid Crystals, vol. 185, pp. 75–87 (1990).

* cited by examiner

*Primary Examiner*—Mark F. Huff
*Assistant Examiner*—Jennifer R Sadula
(74) *Attorney, Agent, or Firm*—Finnegan, Henderson, Farabow, Garrett & Dunner, L.L.P.

(57) ABSTRACT

Compounds for use in the preparation of polymerizable liquid crystalline mixtures, liquid crystalline polymers and optical devices prepared from such mixtures and polymers. The compounds include novel compounds comprising an organosiloxane portion and a portion having a structure that is compatible with a mesogenic molecular architecture.

35 Claims, No Drawings

COMPOUNDS AS COMPONENTS IN POLYMERIZABLE LIQUID CRYSTALLINE MIXTURES AND LIQUID CRYSTAL POLYMER NETWORKS COMPRISING THEM

This application is a national stage filing under 35 U.S.C. §371 of international application No. PCT/IB99/01287, filed on Jul. 14, 1999, which published in the English language.

The present invention relates to the use of a component of a polymerisable liquid crystalline mixture in the production of orientated liquid crystalline polymers; compounds used as components in polymerisable liquid crystalline mixtures; liquid crystalline mixtures comprising these components, liquid crystalline polymers prepared from such components and liquid crystalline devices comprising those compounds.

Liquid crystal polymers (LCPs) are used in the manufacture of optical components such as waveguides, optical gratings, filters, retarders, piezoelectric cells and non-linear optical cells and films. The choice of LCP for use in any one of the aforementioned optical components depends upon its associated optical properties such as the optical anisotropy, refractive index, transparency and dispersion. Optical filters, for example, contain LCPs having a large anisotropy (Δn) and a low dispersion (n=f(λ)).

In some applications there is a requirement to produce LCPs in which the component molecules adopt a specific tilt angle with respect to the plane of the substrate. These LCP materials can be used as optical components such as compensation layers and retarders. Such optical components may be used in the production of liquid crystal devices (LCDs) with improved viewing angles, for example.

LCPs are manufactured by orientating a layer of a polymerisable liquid crystal single compound or mixture on an orientated substrate and cross-linking the mesogenic layer to form a liquid crystal polymer (LCP) network. Polymerisable LC compounds used in the manufacture of the LCPs need to be chemically and thermally stable, stable to electromagnetic radiation, soluble in standard solvents, miscible with other LC components and exhibit liquid crystalline properties over the range 25 to 150° C., preferably 25 to 80° C. The configuration imposed by the orientation layer on the polymerisable LC single compound or mixture becomes fixed or frozen into the LCP network formed upon cross-linking. The resulting LCP films have a high viscosity and are stable to mechanical stresses, temperature and light exposure.

The tilt angle adopted by the polymerisable LC single compound or mixture prior to cross-linking depends in part upon the nature of the LC components comprising that single compound or mixture. Previous strategies employed in generating a tilt angle in a given LC single compound or mixture prior to cross-linking have, for example, relied upon the introduction of one or more lateral substituents into the meosogen, such as a short aliphatic alkyl chain. However, such substitution is accompanied by a decrease in the mechanical properties of the LC material or, depending upon the molecular architecture of the mesogen, is associated with a small or vanishing tilt angle. In each case the reproducibility of the initial tilt is readily lost before the mixture is cross-linked to give the LCP network due to thermal and mechanical effects.

There is therefore a need for a liquid crystalline single compound or mixture that can be orientated on a substrate prior to cross-linking in such a way that the orientation of the LC single compound or mixture on the substrate remains stable over the period required for manufacturing the LCP network. There is also a need for a LC component with the ability to facilitate the generation of and maintain a wide range of predetermined tilt angles prior to and during the manufacture of the LCP film. The present invention addresses those needs.

A first aspect of the present invention provides the use of a component of a LC mixture in the manufacture of a LCP network comprising the mixture, characterised in that the component induces a stable tilt angle in the LCP network. By the word stable it is to be understood to mean that there is no substantial change in the value of the tilt angle over the period necessary for manufacturing the LCP network. The LCP network obtained by cross-linking the polymerisable LC mixture can be a nematic, smectic A or discotic film, but is preferably a nematic film. These films are characterised by good orientation of the film components relative to the substrate.

The component used to induce a stable tilt angle is preferably mesogenic in nature or is compatible with a mesogenic molecular architecture and may contain polymerisable or non-polymerisable substituents. It is preferably miscible with the other components of the liquid crystal mixture. Without wishing to limit the scope of the invention, it is believed that the component must contain a sterically bulky group that has the ability to form a strong association with the substrate or with the orientation layer. The component should also contain a sterically less bulky group that is compatible with a mesogenic molecular architecture and which extends into the bulk of the LC single compound or mixture as a whole. It is believed that this mesogenically compatible group is able to assume an angle in which it is tilted relative to the plane of the substrate. Unlike the LCP mixtures of the prior art, LCPs including these components are less susceptible to thermal effects and the polymerisable LC single compound or mixture comprising or including a component of the present invention is able to retain its initial orientation over the period necessary for manufacturing the LCP network. Judicious choice of the substrate associating and mesogenic extending groups allows this angle to be varied. It will be appreciated that the components of the invention can therefore be used in the manufacture of polymerisable LC single compounds or mixtures having a stable orientation or tilt angle relative to the plane of the substrate.

By sterically bulky it is to be understood that the lateral dimensions of the substrate associating group are at least half as large again as the lateral dimensions of the less bulky group, preferably two or more times the dimensions of the less bulky group.

The substrate associating or more bulky groups preferably comprise organosiloxane groups and the mesogenic extending or less bulky groups preferably contain aromatic or non-aromatic carbocyclic or heterocyclic ring systems. It is believed that the organosiloxane containing components used in the first aspect of the invention include compounds that are new per se and a second aspect of the invention provides an organosiloxane compound of formula I

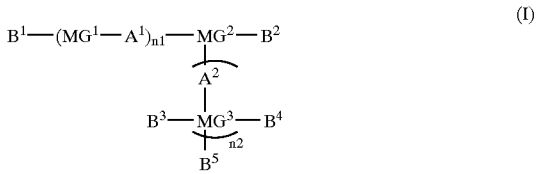

wherein
$B^1$ to $B^4$ each individually represent a spacer group selected from the group comprising optionally substituted saturated or unsaturated, straight chain or branched chain $C_{1-80}$ alkyl group, one or more of the non-adjacent alkyl $CH_2$ groups being optionally replaced by one or more heteroatoms;

$B^5$ represents a hydrogen atom or spacer group as defined above, $A^1$ and $A^2$ each individually represent a single bond or a spacer group as defined above, $MG^1$ to $MG^3$ each individually represent a mesogenic group comprising at least one optionally substituted aromatic or non aromatic carbocyclic or heterocyclic ring systems; and n1 and n2 are each independently 0 or a positive integer with the proviso that, firstly, when n2 is 0 both $B^1$ and $B^2$ include a polymerisable group and at least one of $A^1$, $B^1$ and $B^2$ includes a group selected from an organosiloxane, an organogermanium, an organotin and an organo-perfluoro residue and secondly, when n2 >0 at least one of $B^1$, $B^2$, $B^3$ and $B^4$ includes a polymerisable group and at least one of $A^1$, $A^2$, $B^1$, $B^2$, $B^3$ and $B^4$ includes an organosiloxane group.

By the term 'heteroatom' it should be understood to include nitrogen, oxygen and sulphur. Replacement nitrogen atoms may be further substituted with groups such as alkyl, aryl and cycloalkyl. These compounds have been found to be particularly useful in the preparation of liquid crystalline polymer networks (LCPs) in which the molecules are tilted with respect to the orientation layer. These LCPs can be used in a range of different optical and electrical applications. LCP networks having nematic, smectic A and surprisingly discotic properties may be prepared. Nematic mesophases are preferred.

Most of the discotic liquid crystalline compounds described in prior art are based on disc-shaped molecules (such as triphenylene) which are characterised by a rigid and highly conjugated aromatic central core. These discotic compounds are of limited use because of properties such as a high viscosity, a high melting point, near visible light absorption and problems in their preparation, which also hinders the chemical diversity of the compounds that may be prepared.

There is, therefore, a need for new discotic liquid crystalline materials having reduced melting points and viscosities compared to those obtained with calamitic liquid crystals.

The present inventors have surprisingly found that discotic mesophases may be obtained from rod-shaped molecules, which are more easily prepared and offer the possibility of preparing material having diverse molecular structures. These discotic mesophases may be obtained from molecules having calamitic architecture, by introducing into each one of their peripheral alkyl chains, at least one bulky group which is not compatible (in the liquid crystalline state), with the other molecular constituents. This non compatibility means that these bulky groups tend to associate in the mesophase leading to separate micro layers.

The presence of the bulky groups in each of the peripheral alkyl chains causes the central rigid rod-shaped cores to adopt an intermolecular crossed configuration leading to disc-shaped elements which are able to form discotic mesophases.

The compound of formula (I) may be monomeric, oligomeric or polymeric in nature. It will be appreciated that the value of the integers n1 and n2 will be determined by the nature of the compound of formula (I). When the compound of formula (I) is monomeric or oligomeric in nature, n1 and n2 may assume values of from 0 to 10, preferably from 1 to 5. However when the compound of formula (I) is polymeric in nature the values of n1 and n2 can range from 6 to 3,000 preferably from 11 to 2,000.

The number of aromatic or non-aromatic ring systems present in the groups $MG^1$ to $MG^3$ will depend upon the application in which the compound of formula (I) is to be used. $MG^1$ to $MG^3$ preferably contain between 1 and 4 aromatic or non-aromatic ring systems.

The hydrocarbon spacer groups $B^1$ to $B^4$ may include $C_1$–$C_{20}$-alkyl, $C_1$–$C_{20}$-alkoxy, $C_1$–$C_{20}$-alkoxycarbonyl, $C_1$–$C_{20}$-alkylcarbonyl and $C_1$–$C_{20}$-alkylcarbonyloxy groups, for example, methyl, ethyl, propyl, butyl, pentyl, hexyl, heptyl, octyl, nonyl, decyl, undecyl, dodecyl, methoxy, ethoxy, n-propoxy, i-propoxy, butoxy, pentyloxy, hexyloxy, heptyloxy, octyloxy, nonyloxy, decyloxy, undecyloxy, dodecyloxy, methoxycarbonyl, ethoxycarbonyl, propoxycarbonyl, butoxycarbonyl, pentyloxycarbonyl, hexyloxycarbonyl, octyloxycarbonyl, nonyloxycarbonyl, decyloxycarbonyl, undecyloxycarbonyl, dodecyloxycarbonyl, methylcarbonyl, ethylcarbonyl, propylcarbonyl, butylcarbonyl, pentylcarbonyl, hexylcarbonyl, octylcarbonyl, nonylcarbonyl, decylcarbonyl, undecylcarbonyl, dodecylcarbonyl, methylcarbonyloxy, ethylcarbonyloxy, propylcarbonyloxy, butylcarbonyloxy, pentylcarbonyloxy, hexylcarbonyloxy, octylcarbonyloxy, nonylcarbonyloxy, decylcarbonyloxy, undecylcarbonyloxy, dodecylcarbonyloxy, and the like.

The optionally substituted $C_{1-80}$ alkyl groups may be substituted by alkyl, aryl and cycloalkyl, as well as amino, cyano, epoxy, halogen, hydroxy, nitro, oxo etc. Possible heteroatoms, which may replace carbon atoms, include nitrogen, oxygen and sulfur. In the case of nitrogen further substitution is possible with groups such as alkyl, aryl and cycloalkyl. The optionally substituted aromatic or non-aromatic carbocyclic or heterocyclic ring systems may be similarly substituted.

Any one of the groups $B^1$, $B^2$, $B^3$ and $B^4$ may contain an organosiloxane group and a polymerisable group. Alternatively one or more of the groups $B^1$, $B^2$, $B^3$, $B^4$, $A^1$ and $A^2$ may contain an organosiloxane group with one or more of the other groups of $B^1$, $B^2$, $B^3$ and $B^4$ containing a polymerisable group. Preferably at least one of the groups $B^1$ to $B^4$ includes both a polymerisable group and an organosiloxane group and in a first preferred embodiment of the second aspect of the invention each or any of the groups $B^1$ to $B^4$ may be a hydrocarbon residue of formula (II)

$$P-(Sp^1)_{k1}-[(Si(R^1)_2O)_{m1}-Si(R^2)_2]_{m2}-(Sp^2)_{k2}-(X^1)_{n1}- \quad \text{(II)}$$

wherein

P is a polymerisable group selected from groups comprising $CH_2=CW-$, $CH_2=W-O-$, $CH_2=CW-COO-$, $CH_2=C(Ph)-COO-$, $CH_2=CH-COO-Ph-$, $CH_2=CW-CO-NH-$, $CH_2=C(Ph)-CONH-$, $CH_2=C(COOR')-CH_2-COO-$, $CH_2=CH-O-$, $CH_2=CH-OOC-$, $Ph-CH=CH-$, $CH_3-C=N-(CH_2)_{m3}-$, $HO-$, $HS-$, $HO-(CH_2)_{m3}-$, $HS-(CH_2)_{m3}-$, $HO(CH_2)_{m3}COO-$, $HS(CH_2)_{m3}COO-$, $HWN-$, $HOC(O)-$, $CH2=CH-Ph-(O)_{m4}$

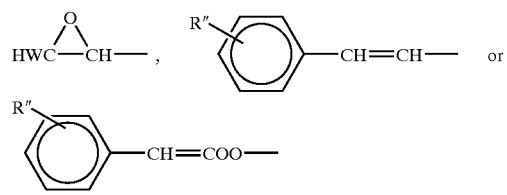

wherein

W represents H, F, Cl, Br or I or a $C_{1-5}$ alkyl group;

m3 is an integer having a value of from 1 to 9;

m4 is an integer having a value of 0 or 1,

R' represents a $C_{1-5}$ alkyl group;

R" represents a $C_{1-5}$ alkyl group, methoxy, cyano, F, Cl, Br or I;

$Sp^1$ and $Sp^2$ each independently represent a $C_{1-20}$ alkylene group;

k1 and k2 are integers, each independently having a value of from 0 to 4;

$R^1$ and $R^2$ each independently represent straight chain or branched $C_{1-20}$ alkyl groups;

m1 is an integer having a value of from 0 to 10;

m2 is an integer having a value of from 1 to 10;

$X^1$ represents —O—, —S—, —NH—, N(CH$_3$)—, —CH(OH)—, —CO—, —CH$_2$(CO)—, —SO—, —CH$_2$(SO)—, —SO$_2$—, —CH$_2$(SO$_2$)—, —COO—, —OCO—, —OCO—O—, —S—CO—, —CO—S—, —SOO—, —OSO—, —SOS—, —CH$_2$ 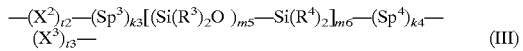 —CH$_2$—, —OCH$_2$—, —CH$_2$O—, —CH=CH—, —C≡C— or a single bond; and t1 is an integer having a value of 0 or 1.

In relation to the hydrocarbon residue of formula (II), the term —Ph— is to be understood as representing 1,4-phenylene, 1,2-phenylene as well as 1,3-phenylene. 1,4-phenylene groups are preferred. The term Ph— or (Ph) should be understood to represent a phenyl group.

The $C_{1-20}$ alkylene groups $Sp^1$ and $Sp^2$ may comprise branched or straight chain alkylene groups and may be unsubstituted, mono- or polysubstituted by F, Cl, Br, I or CN. Alternatively or in addition one or more of the CH$_2$ groups present in the hydrocarbon chain may be replaced, independently, by one or more groups selected from —O—, —S—, —NH—, N(CH$_3$)—, —CH(OH)—, —CO—, —CH$_2$(CO)—, —CH$_2$(SO)—, —SO$_2$—, —CH$_2$(SO$_2$)—, —COO—, —OCO—, —OCO—O—, —S—CO—, —CO—S—, —SOO—, —OSO—, —SOS—, —C≡C—, —(CF$_2$)—$_r$, —CD$_2$)$_s$— or C(W$^1$)=C(W$^2$)—, with the proviso that no two oxygen atoms are directly linked to each other. W$^1$ and W$^2$ each represent, independently, H, H—(CH$_2$)$_{q1}$—, F, Cl, Br or I. The integers r, s and ql each independently represent a number of between 1 and 15.

One or more of the CH$_2$ groups of the $C_{1-20}$ alkyl groups $R^1$ and $R^2$ may each be replaced, independently, by —Si(CH$_3$)$_2$— or/and by —Si(CH$_3$)$_2$O Si(CH$_3$)$_2$—.

Compounds of formula (I) in which A and/or $A^2$ comprise an organosiloxane group are preferred and in a second preferred embodiment of the second aspect of the invention the groups $A^1$ and/or $A^2$ comprise a group of formula (III)

$$—(X^2)_{t2}—(Sp^3)_{k3}[(Si(R^3)_2O)_{m5}—Si(R^4)_2]_{m6}—(Sp^4)_{k4}—(X^3)_{t3}— \quad (III)$$

wherein $Sp^3$ and $Sp^4$ each independently represent the designations assigned to $Sp^1$ and $Sp^2$ above, $X^2$ and $X^3$ each independently represent the designations assigned to $X^1$ above, $R^3$ and $R^4$ each independently represent the designations assigned to $R^1$ and $R^2$ above, k3 and k4 are integers, each integer independently having a value of from 0 to 4, t2 and t3 are integers, each independently having a value of 0 or 1; and m5 is an integer having a value of from 0 to 10; and m6 is an integer having a value of from 1 to 10.

The groups $MG^1$ to $MG^3$ may be the same or different and may comprise up to three bridging groups. A third embodiment of the second aspect of the invention provides compounds of formula (I) in which $MG^1$ comprises a group of formula (IV)

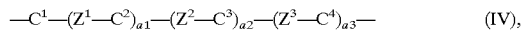

wherein $C^1$ to $C^4$ each independently represent a non aromatic, aromatic, carbocyclic or heterocyclic group;

$Z^1$ to $Z^3$ each independently represent —COO—, —OCO—, —CH$_2$—CH$_2$—, —OCH$_2$—, —CH$_2$O—, —CH=CH—, —C≡C—, —CH=CH—COO—, —OCO—CH=CH— or a single bond; and a1, a2 and a3 are integers, each integer independently having a value of from 0 to 3, with the proviso that a1+a2 +a3 ≦3.

It is especially preferred that the groups $C^1$ to $C^4$ are selected from the following structural formulae:

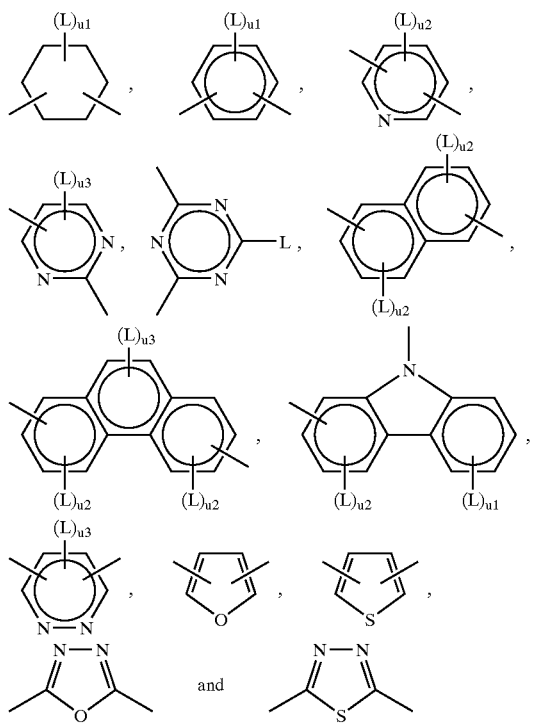

In a fourth embodiment of the second aspect of the invention the groups $MG^2$ and $MG^3$ comprise groups of formula (IVa)

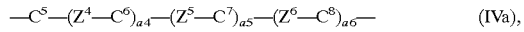

wherein:

$C^5$, $C^6$, $C^7$ and $C^8$ each independently represent a non-aromatic, aromatic, carbocyclic or heterocyclic group; and $Z^4$ to $Z^6$ each independently represent —COO—, —OCO—, —CH$_2$—CH$_2$—, —OCH$_2$—, —CH$_2$O—, —CH=CH—, —C≡C—, —CH=CH—COO—, —OCO—CH=CH— or a single bond; and a4, a5 and a6 are integers, each integer independently having a value of from 0 to 3, with the proviso that firstly a4+a5+a6≦3 and secondly that at least one of $C^5$ to $C^8$ independently comprises a trivalent group.

It is preferred that $C^7$ is the trivalent group. It is especially preferred that $C^7$ selected from one of the following structural formulae:

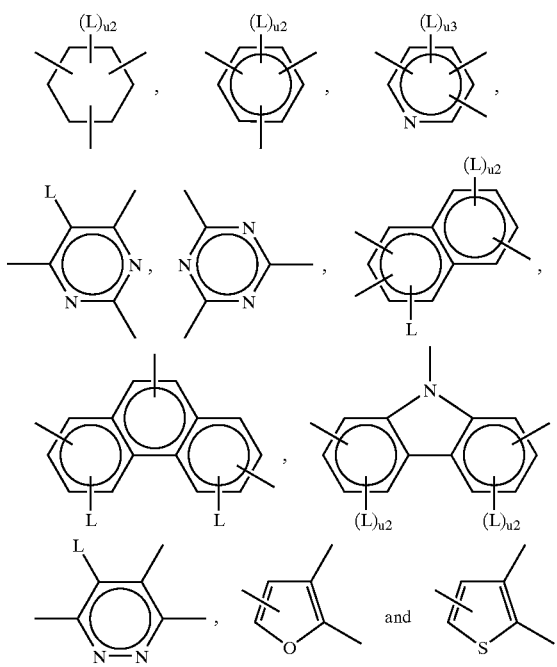

wherein for each of the groups MG$^1$ to MG$^3$ of formulae (IV) and (IVa) respectively L represents —CH$_3$, —COCH$_3$, —NO$_2$, CN, or halogen;
u1 represents an integer having a value of from 0 to 4;
u2 represents an integer having a value of from 0 to 3; and
u3 represents an integer having a value of from 0 to 2.

In an especially preferred fifth embodiment of the second aspect of the invention there is provided a compound of formula (I)
wherein
n1 and n2 are independently 0 or 1;
B$^5$ is hydrogen;
B$^1$ to B$^4$ each independently represent a group of formula (V)

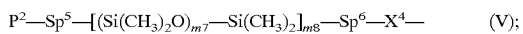
P$^2$—Sp$^5$—[(Si(CH$_3$)$_2$O)$_{m7}$—Si(CH$_3$)$_2$]$_{m8}$—Sp$^6$—X$^4$—  (V);

A$^1$ and A$^2$ each independently represent a group of formula (VI)

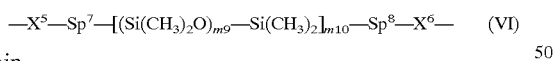
—X$^5$—Sp$^7$—[(Si(CH$_3$)$_2$O)$_{m9}$—Si(CH$_3$)$_2$]$_{m10}$—Sp$^8$—X$^6$—  (VI)

wherein
X$^4$ to X$^6$ each independently represent —O—, —CO—, —COO—, —OCO—, —C≡C—, or a single bond, especially —O—, —COO—, —OCO— or single bond;
Sp$^5$ to Sp$^8$ each independently represent a C$_{1-20}$ straight-chain alkylene group, especially ethylene, propylene, butylene, pentylene, hexylene, heptylene, octylene, nonylene, decylene, undecylene, or dodecylene;
p$^2$ represents CH$_2$=CW$^5$— or CH$_2$=CW$^5$—(CO)$_{v2}$O—
wherein
W$^5$ represents H, CH$_3$, F, Cl, Br or I; and
v2 is 0 or 1;
m7 and m9 are integers, each independently having a value of 1 or 2;
m8 and m10 are integers, each independently having a value of 0 or 1; with the proviso that m8+m10>0;

MG$^1$ represents a group of formula IV wherein
C$^1$, C$^2$, C$^3$ and C$^4$ are the same and are selected from phenylene or biphenylene; and
Z$^1$ to Z$^3$ each independently represent a single bond, —COO— or —OCO—; and
MG$^2$ and MG$^3$ each independently represent a group of formula IVa wherein
C$^5$, C$^6$, and C$^8$ are the same and are selected from phenylene or biphenylene;
C$^7$ represents phenylene or biphenylene; and
Z$^4$ to Z$^6$ each independently represent a single bond, —COO— or —OCO—.

The surprising ability of the compounds of the invention to form discotic mesophases has been discussed to above. The compounds of the invention that have been found to be particularly suitable for the preparation of discotic mesophases are those having a bulky group in each of their peripheral alkyl chains B$^1$ and B$^2$. As mentioned previously it is believed that the presence of the bulky groups causes the rod-shaped molecules of the invention to associate thereby forming disc-shaped elements, which are stabilising to discotic mesophases.

Suitable bulky groups include fluorinated alkyl residues as well as and organic residues having bulky atoms such as germanium, silicon, and tin.

Preferably the bulky groups comprise organic residues having tetravalent bulky atom such as germanium, silicon, and tin. It is especially preferred that the bulky groups comprise at least one silioxane group. It is more especially preferred that each of the groups B$^1$ and B$^2$, include at least one siloxane group.

It is preferred that the central core of molecules having the ability to form a discotic mesophase comprises at least one optionally substituted aromatic or non-aromatic carbocyclic ring system. More preferably the central cores are selected from those that are able to induce a calamitic mesophase.

The bulky groups are preferably each independently attached to the central core of the molecule via a C$_{1-20}$ alkyl spacer group as defined above.

A preferred sixth embodiment of the second aspect of the invention provides a compound of formula (I) in which
n1 and n2 are both 0,
B$^1$ and B$^2$ each independently represent a group of formula (VII)

P$^3$—Sp$^5$—[(Si(CH$_3$)$_2$O)$_{m7}$—Si(CH$_3$)$_2$]$_{m8}$—Sp$^6$—X$^4$—  (VII);

wherein
X$^4$ represents —O—, —CO—,—COO—,—OCO—, —C≡C— or a single bond, especially —O—,—COO—,—OCO— or single bond;
Sp$^5$ to Sp$^6$ each independently represent a C$_{1-20}$ straight-chain alkylene group, especially ethylene, propylene, butylene, pentylene, hexylene, heptylene, octylene, nonylene, decylene, undecylene, or dodecylene;
P$^3$ represents a hydrogen or CH$_2$=CW$^5$— or CH$_2$=CW$^5$—(CO)$_{v2}$O—wherein
W$^5$ represents H, CH$_3$, F, Cl, Br or I; and
v2 is 0 or 1;
m7 is 1 or 2;
m8 is 1;
MG$^2$ represents a group of formula IVa wherein
C$^5$,C$^6$, and C$^8$ are the same and are selected from phenylene or biphenylene;
C$^7$ represents phenylene or biphenylene; and
Z$^4$ to Z$^6$ each independently represent a single bond, —COO— or —OCO—.

These compounds are particularly suitable for the preparation of materials having discotic mesophases.

The compounds according to the second aspect of the invention may be readily prepared using methods that are well known to the person skilled in the art, such as those documented in Houben-Weyl, Methoden der Organischen Chemie, Thieme-Verlag, Stuttgart. In particular, the compounds may be readily prepared from direactive organosiloxane compounds according to any one of Schemes 1 to 5.

A third aspect of the invention provides a method for the preparation of compounds according to the second aspect of the invention comprising reacting a direactive siloxane with a mesogenic compound comprising at least one carbocyclic or heterocyclic ring system.

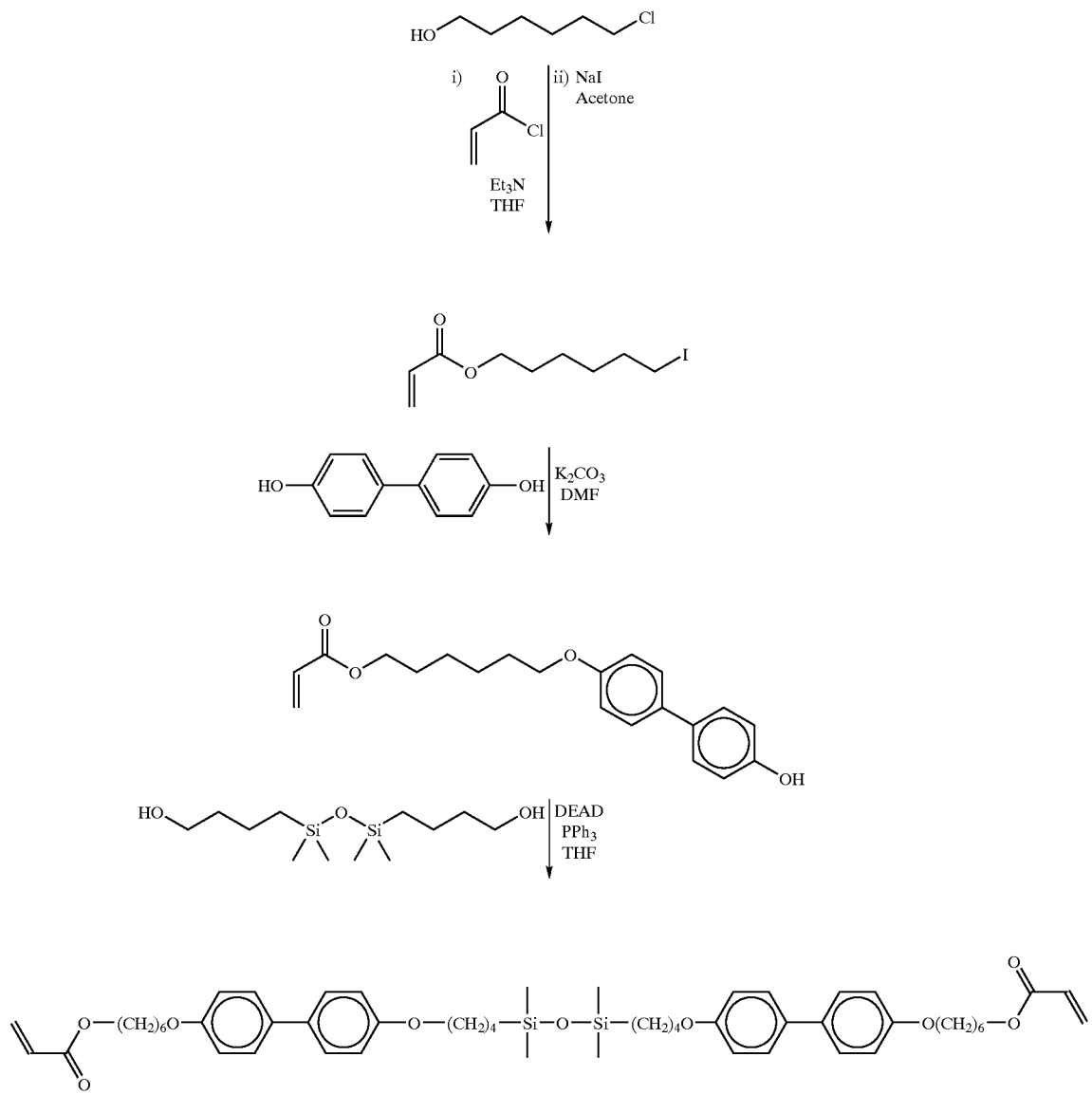

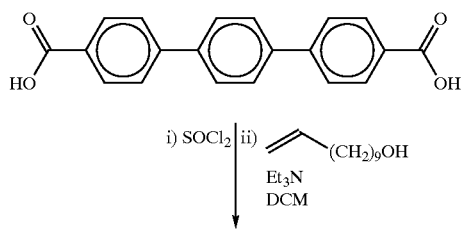

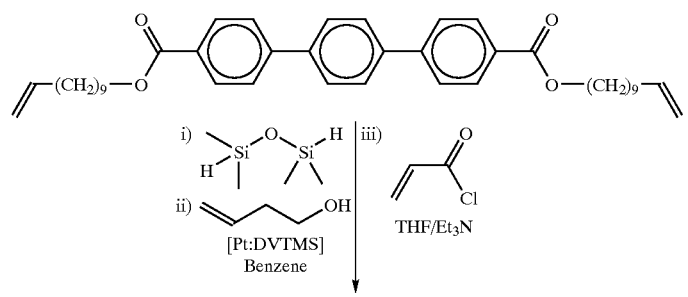
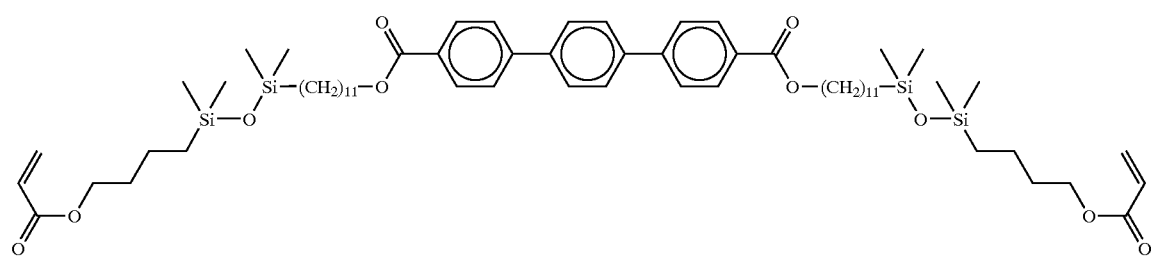
Scheme 3:
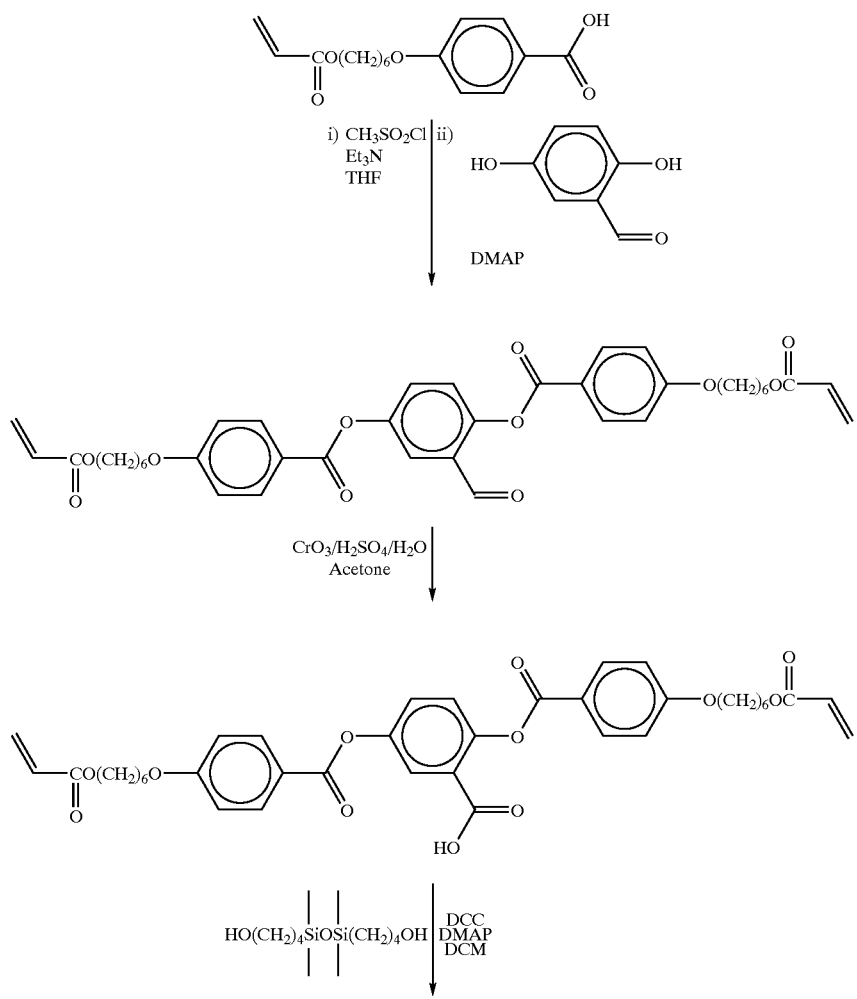

-continued
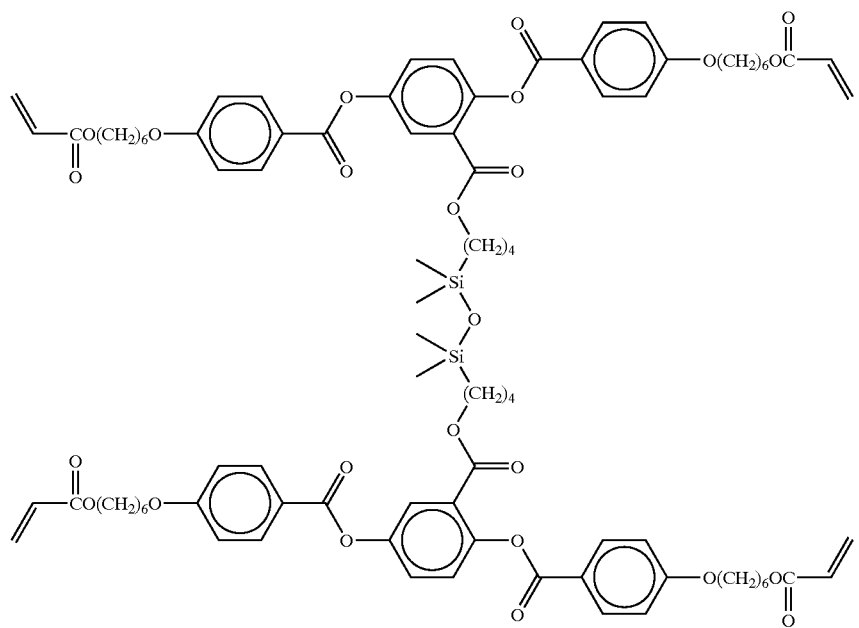
Scheme 4
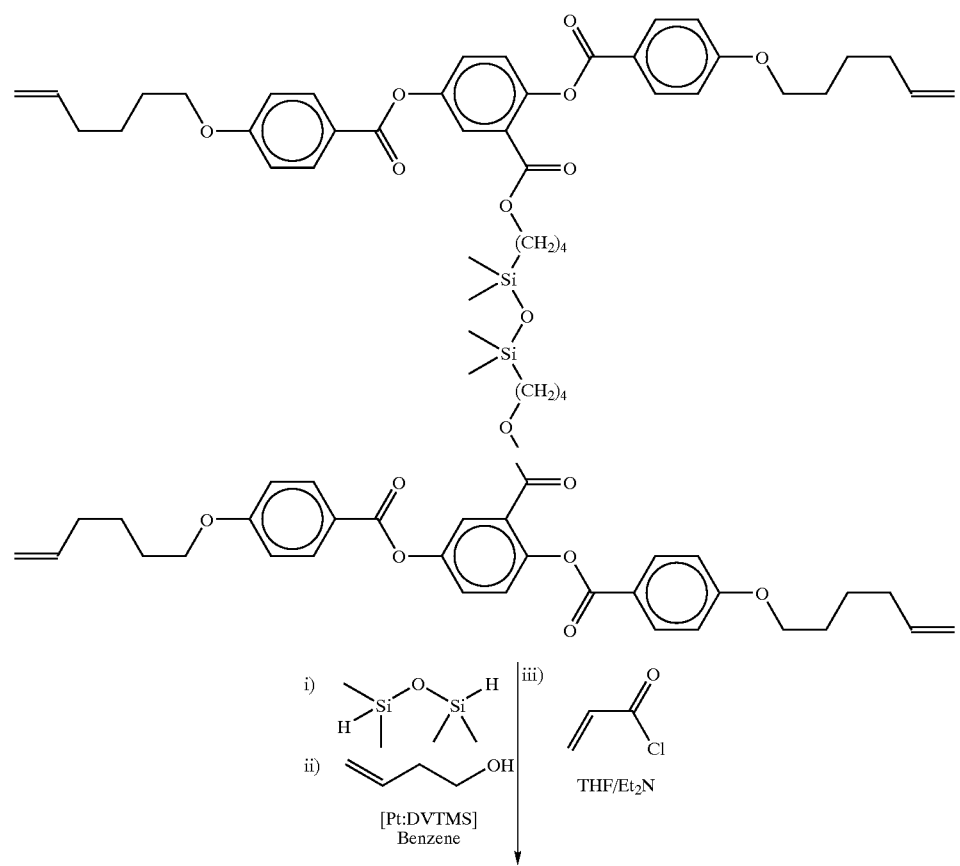

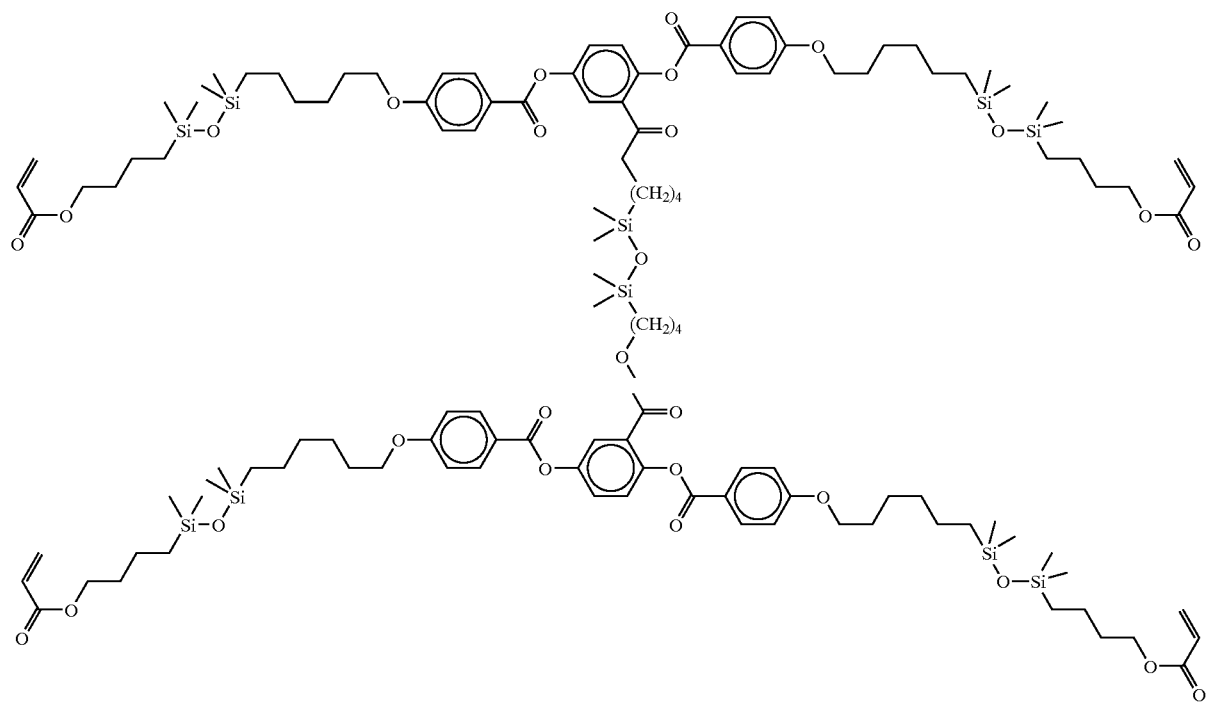
Scheme 5
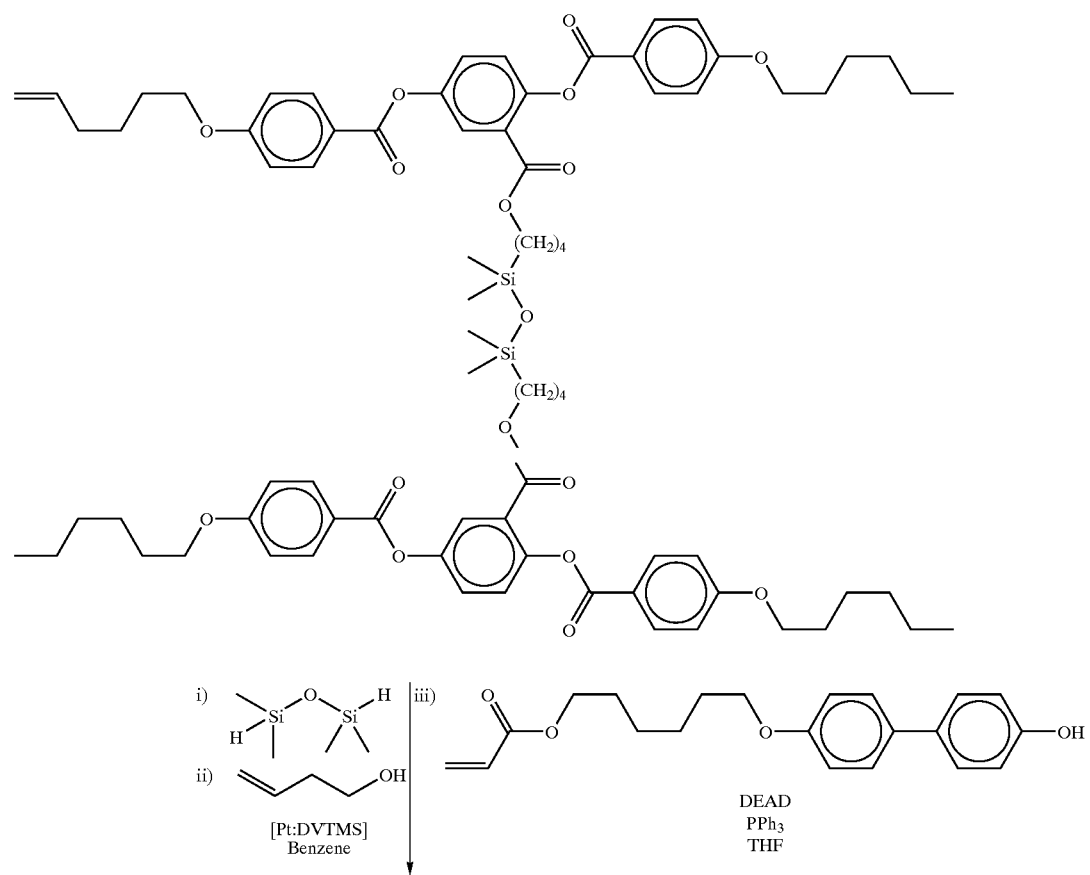

-continued

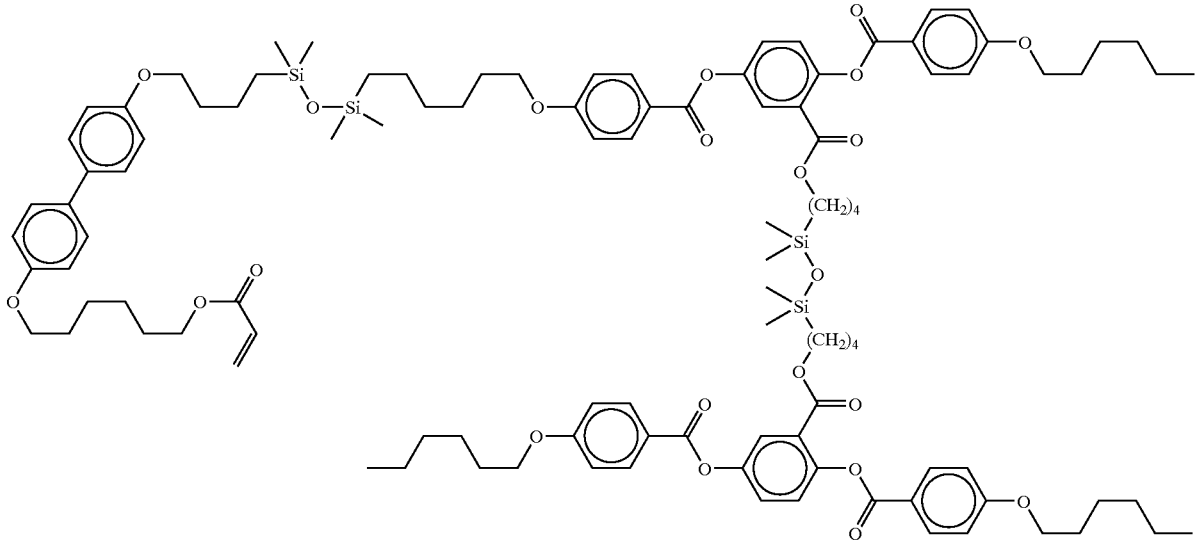

The organosiloxane compounds according to the second aspect of the invention may be used alone or as a component of a liquid crystal mixture. Liquid crystalline materials comprising a compound of formula (I) may be used in the manufacture of LCPs. A fourth aspect of the invention therefore comprises a liquid crystalline material comprising a compound of formula (I). Preferably the liquid crystalline materials comprises at least two components. The additional components must be miscible with the compound of formula (I) and may selected from known mesogenic materials such as those reported in Adv. Mater. 5, 107 (1993), Mol. Liq. Crsyt. 307, 111 (1997), J. Mat. Chem. 5, 2047 (1995) or in patent applications U.S. Pat. Nos. 5,593,617; 5,567,349; GB-A-2 297 556; GB-A-2 299 333; DE-A-195 04 224; EP-A-0 606 940; EP-A-0 643 121 and EP-A-0 606 939, optionally selected from EP-A-0 606 940; EP-A-0 643 121 and EP-A-0 606 939.

The form of the liquid crystal material will depend upon the application in which it is to be used and may be present as a liquid crystalline mixture, (co)polymer, elastomer, polymer gel or polymer network. Polymer networks have been found to be of particular use and in a first preferred embodiment of the fourth aspect of the invention there is provided a polymer network comprising a compound of formula (I) in cross-linked form. Preferably the polymer network comprises at least two components, at least one of which is an organosiloxane compound of formula (I).

The polymer network may be prepared by the copolymerisation of a mesogenic mixture comprising:

i) at least one chiral or/and achiral mesogenic polymerisable compound;
ii) at least one organosiloxane compound of formula I; and
iii) an initiator.

The chiral or achiral mesogenic polymerisable compound may be an organosiloxane compound of formula (I). Alternatively or in addition, the polymerisable compound may be selected from the known mesogenic materials referred to above. Preferably the chiral or achiral polymerisable compound includes the nematic phase in its thermotropic sequence.

The polymer network may optionally comprise further components. These include further polymerisable compounds, stabilisers and dyes. The additional polymerisable compounds preferably comprise a non-mesogenic compound having at least one polymerisable functional group, especially diacrylate compounds.

Any suitable stabiliser that prevents undesired spontaneous polymerisation, for example during storage of the mixture, may be used in the liquid crystalline mixture according to the invention. A broad range of these compounds is commercially available. Typical examples include 4-ethoxyphenol or 2,6-di-(t-butyl)-4-hydroxytoluene (BHT).

If colour filters are required, dyes may be added to the mixture. In a preferred embodiment of the invention the LC mixture contains no dye.

The chiral or achiral polymerisable mesogenic compound may be present in an amount comprising 0.01 to 99% by weight of the liquid crystalline polymer network mixture, preferably 50 to 95% by weight.

The organosiloxane compound of formula (I) may be present in an amount from 0.1 to 100% by weight of the liquid crystalline network, preferably from 1 to 50% by weight.

The initiator is preferably a photoinitiator and may be a radical or cationic initiator that is present in an amount comprising 0.1 to 5% by weight of the polymer mixture, preferably from 0.2 to 2% by weight.

When the mixture further comprises a stabiliser, this is generally present in an amount comprising 0 to 5% by weight of the liquid crystalline mixture, preferably from 0.1 to 1% by weight.

These polymerisable liquid crystalline mixtures may be formed into liquid crystalline polymer (LCP) films and a fifth aspect of the invention provides a LCP film comprising a compound of formula (I). LCP films may be readily prepared by UV polymerisation of a LC mixture according to the fourth aspect of the invention; a film comprising the LC mixture is formed on a substrate and polymerised using UV light to give a cross-linked liquid crystal polymer (LCP) film. The film is both light and temperature stable and can be used in the manufacture of devices such as waveguides, optical gratings, filters, retarders, piezoelectric cells or thin films exhibiting non-linear optical properties.

Different methods can be used for the formation of the sought LCP network, starting from the polymerisable liquid crystalline mixture manufactured as described above. Transparent substrates such as coated ITO (indium tin oxide), glass or plastic substrates, may be used. Preferred substrates include glass or plastic, especially those including a layer of rubbed polyimide or polyamide or a layer of photooriented photopolymer (LPP). Said layers are used to facilitate uniform orientation of the liquid crystalline mixture.

In the preparation of LCP films, it is particularly important to prevent the formation of defects or inhomogenities. This can be achieved by forming the polymerisable liquid crystalline mixture into a thin film; placing the mixture between two of the aforementioned substrates which are then sheared over a small distance until a planar order was obtained; or capillary filling the polymerisable liquid crystalline mixture between two of the said substrates prior to curing with, for example, by UV light, preferably in the presence of a photoinitiator, such as Irgacure®.

The invention will now be described with reference to the following examples. Variations on these falling within the scope of the invention will be apparent to a person skilled in the art.

In the following Examples the thermotropic phases are abbreviated as follows:

| K | crystalline |
|---|---|
| D | discotic |
| S | smectic |
| N | nematic |
| N* | chiral nematic (cholesteric) |
| I | isotropic |

EXAMPLE 1

1,3-Bis-{4-[4-oxo-4'-(6-acryloyloxyhexyloxy)biphenyl]but-1-yl}-1,1,3,3-tetramethyldisiloxane

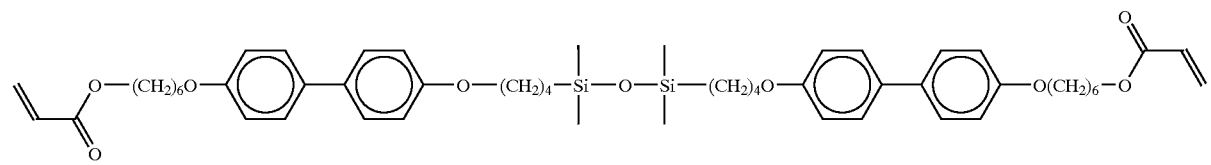

(a) Acrylic acid 6-iodohexyl ester

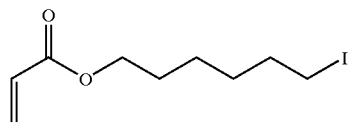

To a stirred solution of 6-chloro-1-hexanol (27.3 g, 0.2 mol), triethylamine (56 ml, 400 ml) in 100 ml of dichloromethane, cooled at 0° C. and maintained under argon atmosphere, acroylchloride (19.5 ml, 0.24 mol) was added dropwise. After complete addition (30 min), the reaction mixture was stirred at room temperature overnight, diluted with 300 ml of dichloromethane and washed with water (200 ml) and saturated NaCl solution (3×150 ml). The organic phase was dried over magnesium sulfate, filtered and evaporated to dryness. This gave 43 g of a brownish oil as a crude product. The crude product was filtered over a silica-gel column (Hexane/Ether: 19/1) to give 21.45 g of pure acrylic acid 6-chlorohexyl ester. The 6-chlorohexyl ester was dissolved in 500 ml of acetone containing sodium iodide (84.3 g, 0.56 mol) and heated at reflux for 22 h. The precipitated sodium chloride was filtered off and the solvent was removed to give a yellowish residue which was dissolved in 300 ml of ether and washed with water (100 ml), saturated NaCl solution (3×150 ml) and dried over magnesium sulfate. The magnesium sulfate was removed by filtration. Removal of the ether solvent gave acrylic acid 6-iodo-hexyl ester as yellowish oily compound. Yield 31.74 g.

(b) Acrylic acid 6-(4'-hydroxybiphenyl-4-oxy)hexyl ester

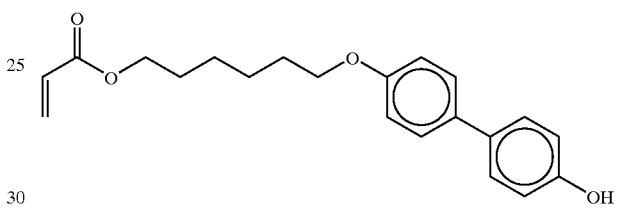

A solution of 4,4'-dihydroxybiphenyl (3.72 g, 20 mmol), acrylic acid 6-iodohexyl ester (4.21 g, 15 mmol) and potassium carbonate (2.07 g, 15 mmol) in DMF (50 ml) was stirred overnight at room temperature and under argon atmosphere. The reaction mixture was then poured into HCl 3N (100 ml) and extracted with ether (3×200 ml). The combined organic extracts were washed with saturated NaCl solution (200 ml), dried over magnesium sulfate, filtered and evaporated to dryness. The crystalline residue obtained was purified on silica-gel column (CH$_2$Cl$_2$, CH$_2$Cl$_2$/Et$_2$O:19/1). This gave acrylic acid 6-(4'-hydroxybiphen-4-yloxy-)hexyl ester as white crystalline material. Yield 2.5 g.

(c) 1,3-Bis[4-(4-oxo-4'-(6-acryloyloxyhexyloxy)biphenyl)but-1-yl]-1,1,3,3-tetramethyldisiloxane

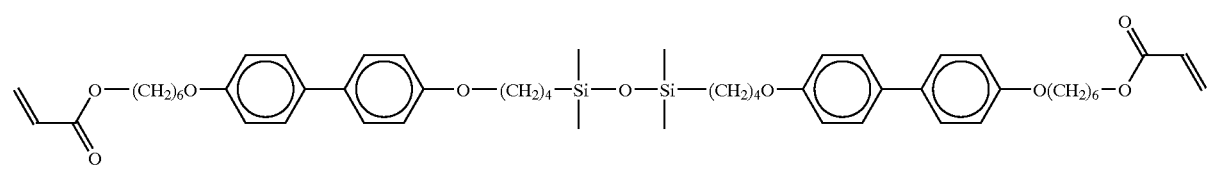

To a solution of acrylic acid 6-(4'-hydroxybiphen-4-yloxy-)hexyl ester (1.77 g, 5.2 mmol), triphenylphosphine (TPP) (1.36 g, 5.2 mmol) and 1,3-bis(4-hydroxybutyl)-1,1,3,3-tetramethyldisiloxane (0.70 g, 2.5 mmol) in dry THF (30 ml), cooled at 0° C. and maintained under argon atmosphere, diethyl azodicarboxylate (0.91 g, 5.2 mmol) was added dropwise over 30 min. After complete addition the reaction mixture was stirred at room temperature for 6 hours, then evaporated to dryness to give a residue which was purified by chromatography over a silica-gel column (CH$_2$Cl$_2$) to afford 1,3-Bis[4-(4-oxo-4'-(6-acryloyloxyhexyloxy)biphenyl)but-1-yl]-1,1,3,3-tetramethyldisiloxane as white crystalline material. Yield 2.1 g This compound has the following thermotropic sequence: K 99° C. I The following compounds may also be prepared in a similar way in accordance with Scheme 1:

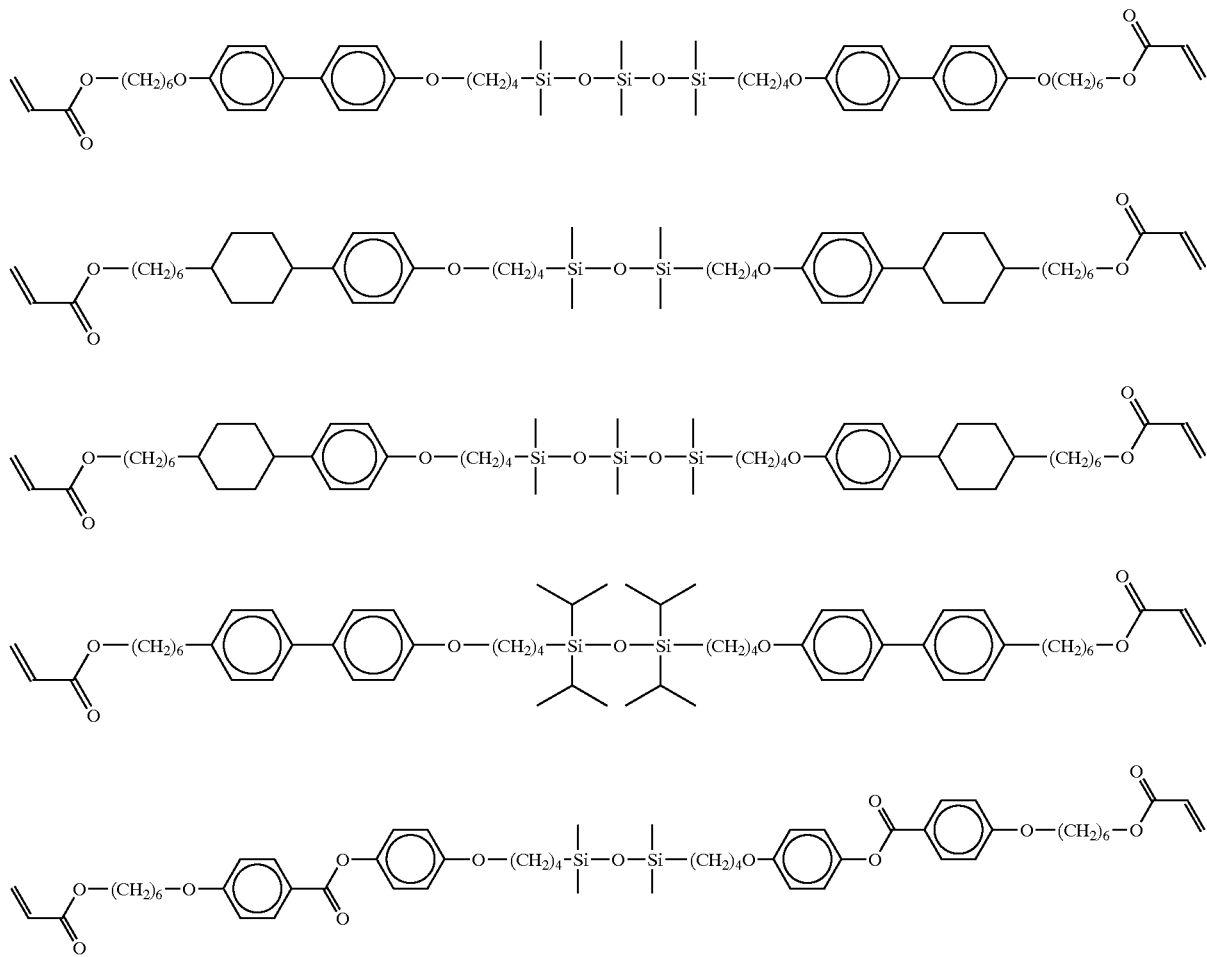

EXAMPLE 2

[1,1';4',1"]Terphenyl-4,4"-dicarboxylic acid bis-{11-[3-(4-acryloyloxybutyl)-1,1,3,3-tetramethyldisiloxanyl]undecyl}ester

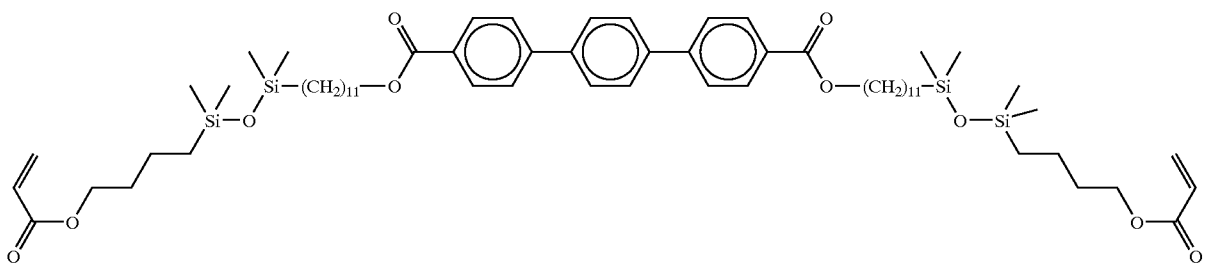

a) [1,1'4',1"]Terphenyl-4,4"-dicarboxylic acid diundec-10-enyl ester

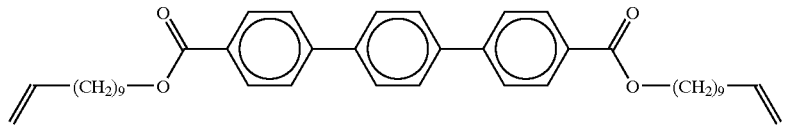

A suspension of [1,1';4',1"]terphenyl-4,4"-dicarboxylic acid (6.37 g, 20 mmol) in 100 ml of thionyl chloride was heated at reflux for 12 h then thionyl chloride was evaporated by azeotropic distillation. The crude yellow residue obtained therefrom was mixed with 10-undecen-1-ol (7.49 g, 44 mmol) in dichloromethane (300 ml) and triethylamine (8.9 g, 88 mmol) was added dropwise to the resulting mixture. The reaction mixture was stirred at 6 h at room temperature, then poured into water (300 ml) and extracted with dichloromethane (2×400 ml). The combined organic extracts were washed with saturated NaCl solution (500 ml), dried over magnesium sulphate, filtered and evaporated to dryness to give a brownish residue which was recrystallised from acetone/dichlorometane: 9/1 to afford pure [1,1';4',1"]terphenyl-4,4"-dicarboxylic acid diundec-10-enyl ester as white crystalline material. Yield 8.97 g.

b) [1,1';4',1"]Terphenyl-4,4"-dicarboxylic acid bis-{11-[3-(4-acryloyloxybutyl)-1,1,3,3-tetramethyldisiloxanyl]undecyl)}ester temperature was increased to 80° C. The reaction mixture was stirred for a further 1 h at this temperature. Removal of the benzene and excess disiloxane from the reaction mixture by distillation under reduced pressure gave a pasty yellow residue that was mixed with hot hexane (100 ml). The hexane mixture was filtered hot and evaporated to dryness. The pasty residue was dissolved in 40 ml of dry benzene and mixed with 3-buten-1-ol (2.31 g, 32 mmol)). The resulting solution was stirred for 15 min at room temperature. 10 µl of the platinum catalyst was then added to the solution and the reaction mixture was heated to 80° C. for 2 h. A further 10 µl of the platinum catalyst was added to the reaction mixture which was stirred for a further 1 h at 80° C. The resulting dark reaction mixture was evaporated to dryness to give a dark pasty residue which was dissolved in 120 ml of dry THF. To this mixture 10 ml of Et$_3$N was added followed by dropwise addition (at −10 to 0° C. and under N$_2$) of a solution of acroyl chloride (2.9 g, 32 mmol) in 30 ml of dry THF. After complete addition (20 min) the reaction mixture was stirred for further 6 h at room temperature. THF and excess Et$_3$N were removed under reduced pressure to give a

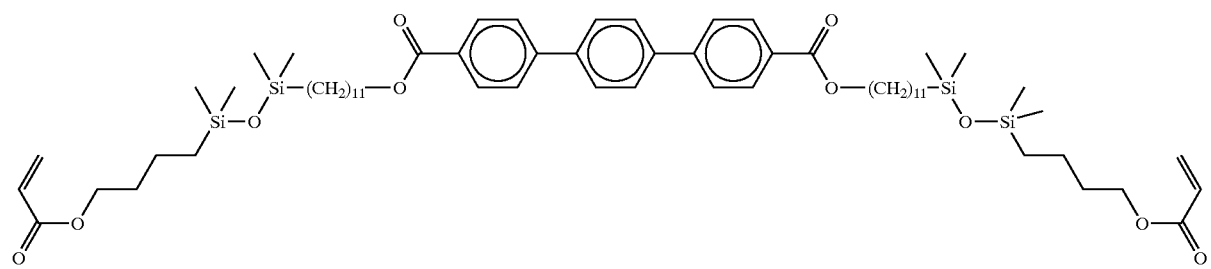

To a mixture of [1,1';4',1"]terphenyl-4,4"-dicarboxylic acid diundec-10-enyl ester (5 g, 8.03 mmol) and 1,1,3,3-tetramethyldisiloxane (8.63 g, 64.24 mmol.) in benzene (20 ml), stirred at room temperature and under argon atmosphere, 20 µl of platinum—divinyltetramethyldisiloxane catalyst [PT:DVTMS] (complex in xylene, 2.1–2.4% platinum) was added. The hydrosilylation reaction started immediately. After stirring for 1 h at room temperature, further 5 µl of the platinum catalyst was added to the reaction mixture, which was then heated at 70° C. overnight. A further 5 µl of the platinum catalyst was added and the dark-yellow residue that was dissolved in minimum CH$_2$Cl$_2$ (80 ml) and poured into 300 ml of Et$_2$O. The precipitated triethylammonium salts were removed by filtration and the filtrate was evaporated to dryness to give a brown residue (14.2 g) which was purified by chromatograpy on SiO$_2$ column using Et$_2$O/Hexane: 1/4 as eluent to give [1,1';4',1"]terphenyl-4,4"-dicarboxylic acid bis-{1,1-[3-(4-acryloyloxybutyl)-1,1,3,3-tetramethyldi- siloxanyl]undecyl}ester as pasty white product. Yield 5.58 g. This compound has the following thermotropic sequence: D 40° C. I

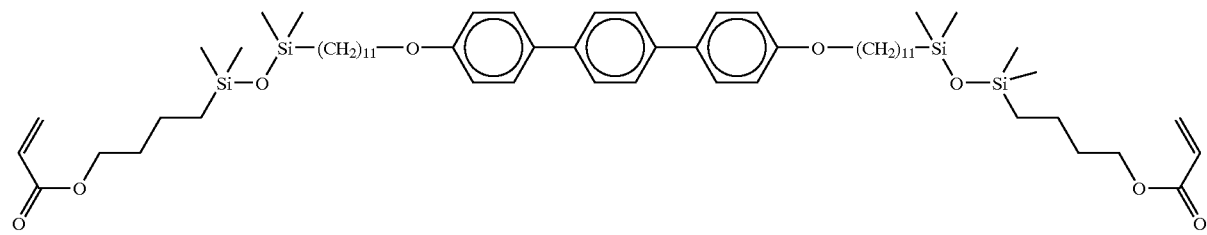
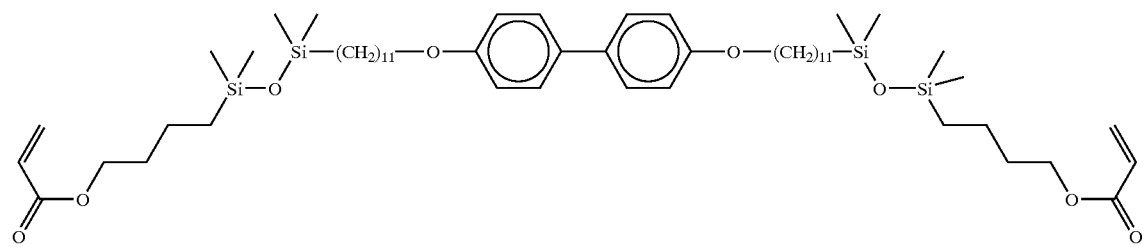
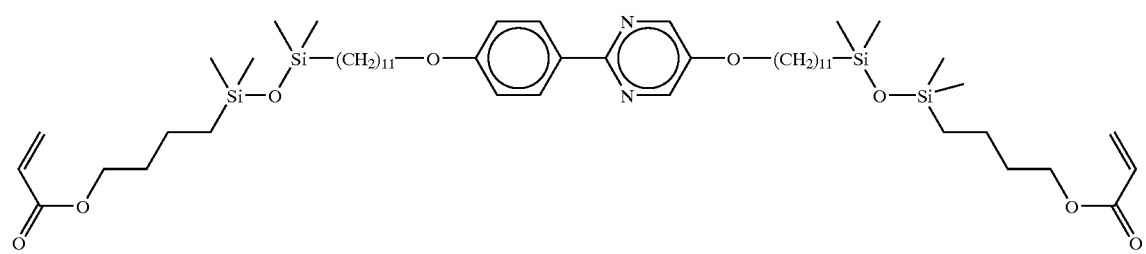
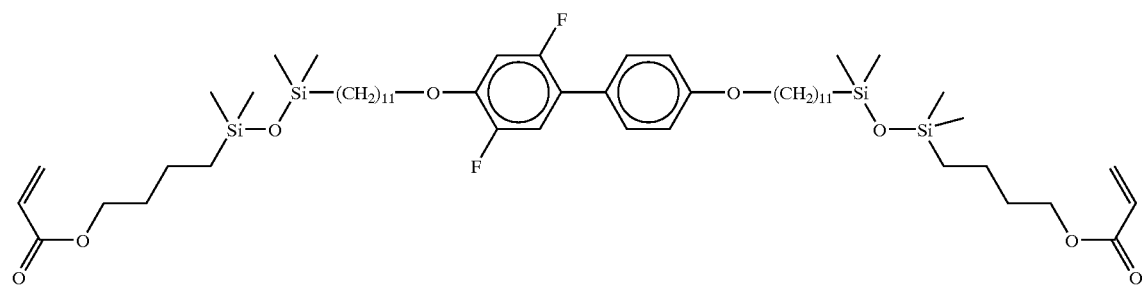
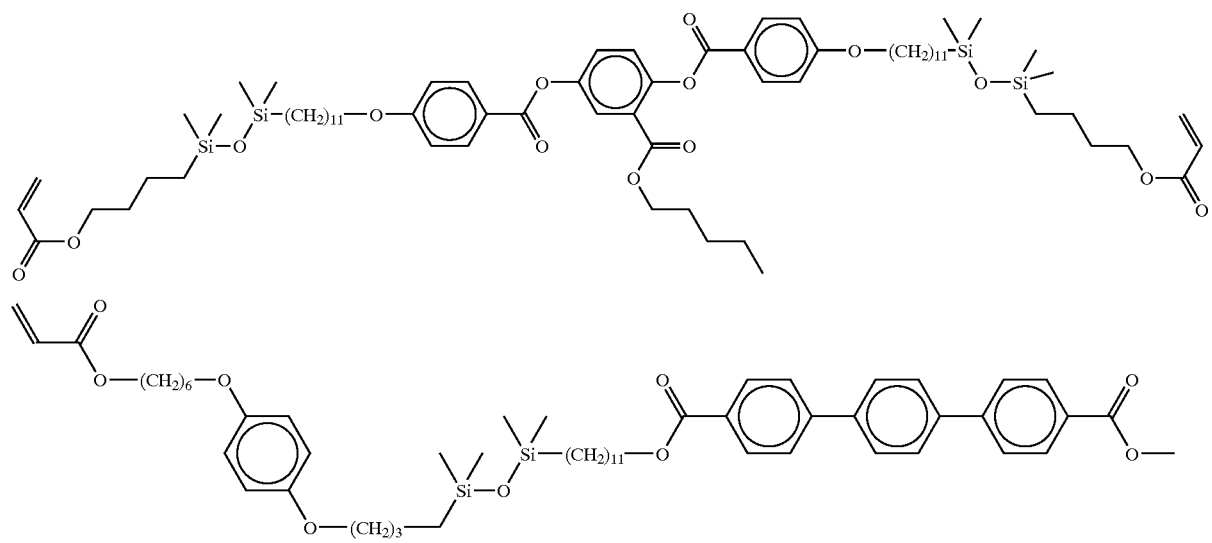

-continued
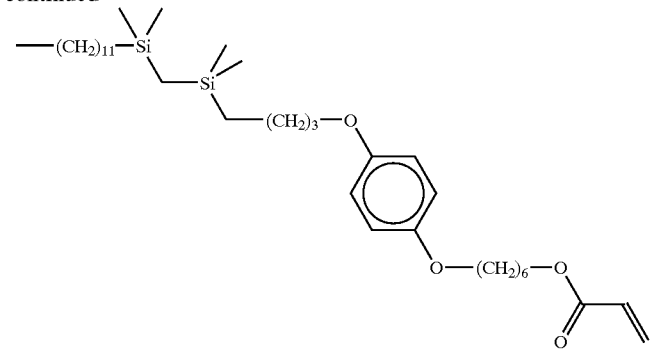
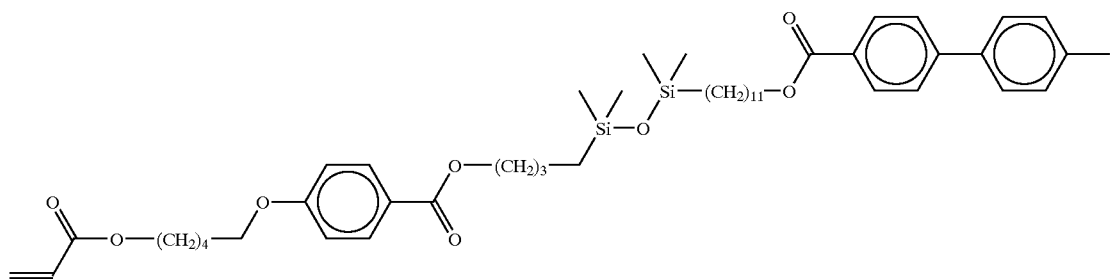
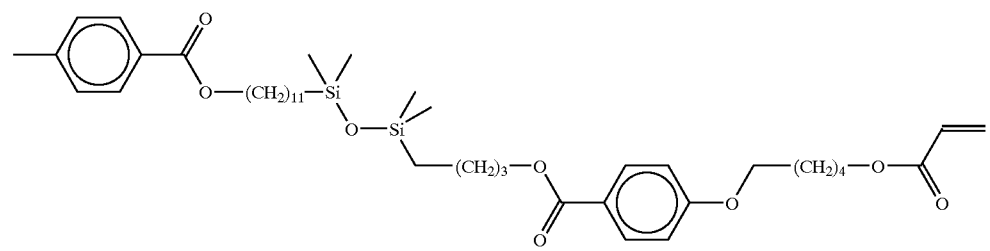
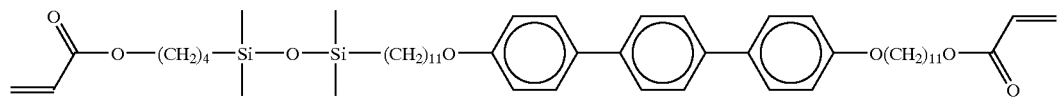
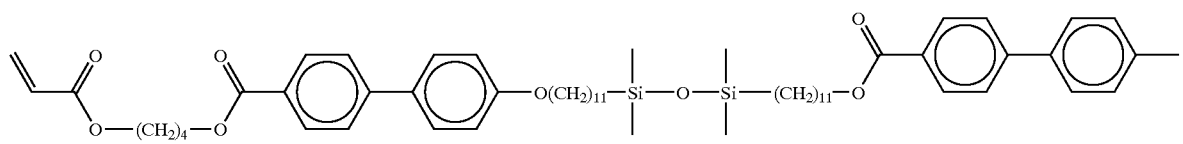
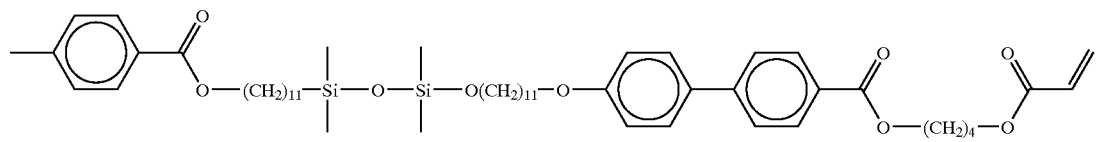

EXAMPLE 3

1.3-Bis-{4-[2,5-di-(4-(6-acryloyloxyhexyloxy)phenylcarbonyloxy)phenylcarbonyloxy]-but-1-yl}-1,1,3,3-tetramethyldisiloxane

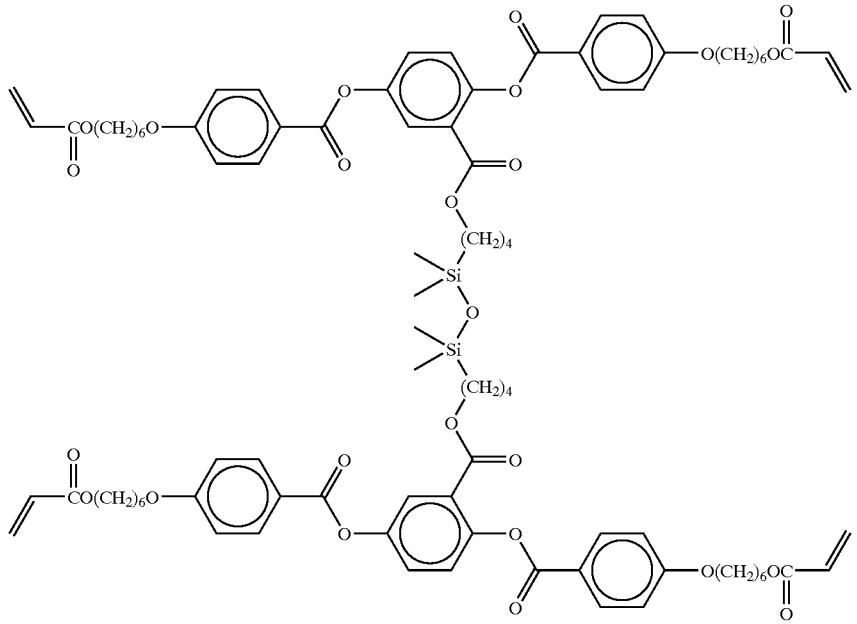

a) 2,5-Di-[4-(6-acryloyloxyhexyloxy)phenylcarbonyloxy]benzaldehyde

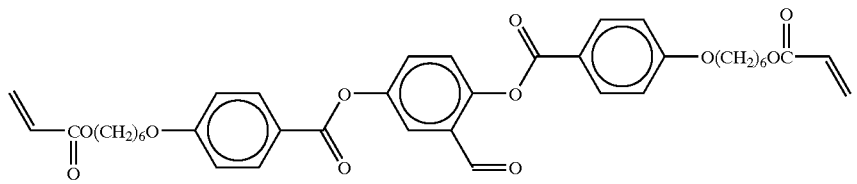

A solution of mesylchloride (4.23 g, 36.94 mmol) in 10 ml of dry THF was added dropwise under argon over a period of 15 minutes to a cooled (−25 °C.) solution of 4-(6-acryloyloxyhexyloxy)benzoic acid and triethylamine (20 ml) in 80 ml of dry THF. The reaction mixture was then stirred for 60 min at −25 °C., treated with a solution of 2,5-dihydroxybenzaldehyde (2.3 g, 16.65 mmol) in 60 ml of dry THF containing 195 mg of DMAP and further stirred at −25° C. for 2 h. The reaction mixture was then allowed to warm to room temperature and stirring was continued overnight. The reaction mixture was then poured into 120 ml of saturated NaHCO$_3$ and extracted with 2×200 ml of ether. The combined organic extracts were washed with 3N HCl (200 ml) and semi-saturated NaCl solution (2×100 ml), dried over MgSO$_4$, filtered and dried to give a slightly yellow pasty material. This was purified by flash chromatography over a short silica column (CH$_2$Cl$_2$/Et$_2$O:19.5/0.5) to give a white residue (9.25 g) which was dissolved in CH$_2$Cl$_2$ (25 ml) then recrystallised from ethanol (250 ml) to give pure 2,5-di-[4-(6-acryloyloxy-hexyloxy)hexyloxy)phenylcarbonyloxy]benzaldehyde as a white crystalline material. Yield 8.5 g.

b) 2,5-Di-[4-(6-acryloyloxyhexyloxy)phenylcarbonyloxy]benzoic acid

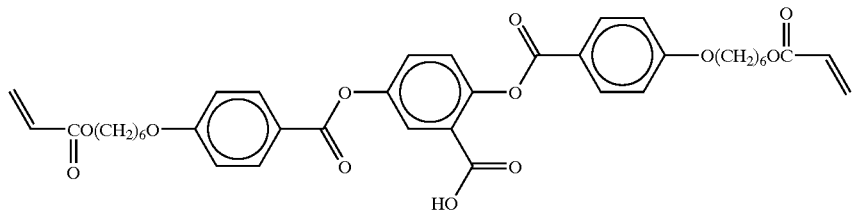

Jones oxidant (CrO$_3$/H$_2$SO$_4$/H$_2$O) (48 ml) was added to a ice-cooled solution of 2,5-di-[4-(6-acryloyloxyhexyloxy)phenylcarbonyloxy]benzaldehyde (8.24 g, 12 mmol) in acetone (300 ml) in a dropwise fashion over a period of 30 min. The reaction mixture was stirred overnight at room temperature. The resulting green-orange mixture was filtered off to leave a green precipitate that was washed with 600 ml of ether. The combined organic solutions were washed with water until the orange coloration disappeared (6×250 ml). The colourless organic solution obtained was washed with saturated NaCl solution (2×300 ml), dried over MgSO$_4$ and filtered. Removal of the solvent gave pure 2,5-di-[4-(6-acryloyloxyhexyloxy)phenylcarbonyloxy]benzoic acid as a white crystalline material. Yield 8.5 g.

c) 1,3-Bis-{4-[2,5-di-(4-(6-acryloyloxyhexyloxy)phenylcarbonyloxy)-phenylcarbonyloxy]but-1-yl}-1,1,3,3-tetramethyldisiloxane

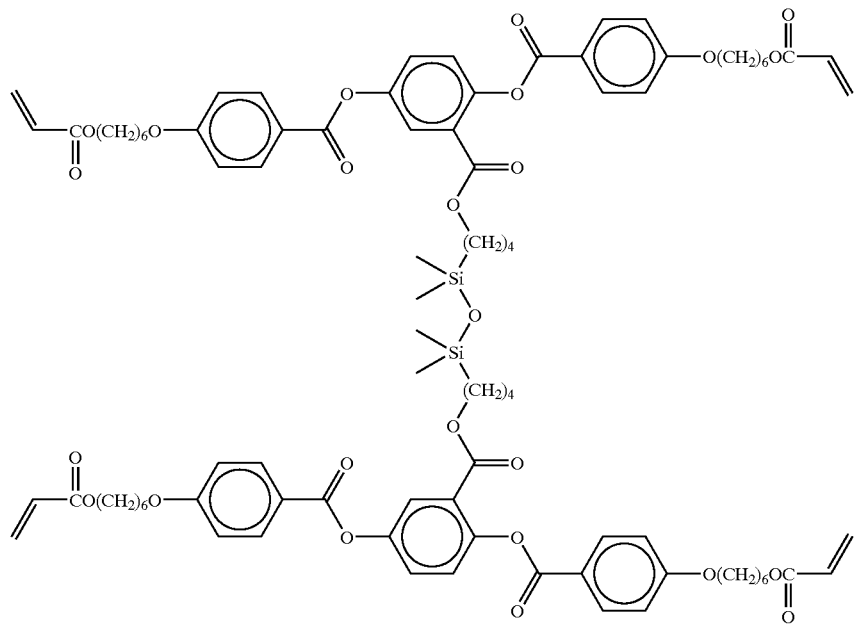

To a stirred solution of 2,5-di-[4-(6-acryloyloxyhexyloxy)phenylcarbonyloxy]-benzoic acid (0.77 g, 1.10 mmol), 4-dimethylaminopyridyne (13 mg, 0.11 mmol) and 1,3-bis(4-hydroxybutyl)-1,1,3,3-tetramethyldisiloxane (0.14 g, 0.5 mmol) in dichloromethane (25 ml), at 0° C., a solution of N,N'-dicyclohexylcarbodiimide (0.21 g, 1.10 mmol) in dichloromethane (5 ml) was added dropwise over a period of 15 min. The reaction mixture was warmed to room temperature and stirred overnight. Removal of the solvent gave a residue which was then purified by chromatography over a short silica-gel column (CH$_2$Cl$_2$, CH$_2$Cl$_2$/Et$_2$O: 19/1) to give 1,3-bis-{4-[2,5-di-(4-(6-acryloyloxy-hexyloxy)phenylcarbonyloxy)phenylcarbonyloxy]-but-1-yl}-1,1,3,3-tetramethyldisiloxane as a white crystalline material. Yield: 0.59 g.

This compound has the following thermotropic sequence:
N 43.8° C. I

The following compounds may also be prepared in a similar way in accordance with Scheme 3:

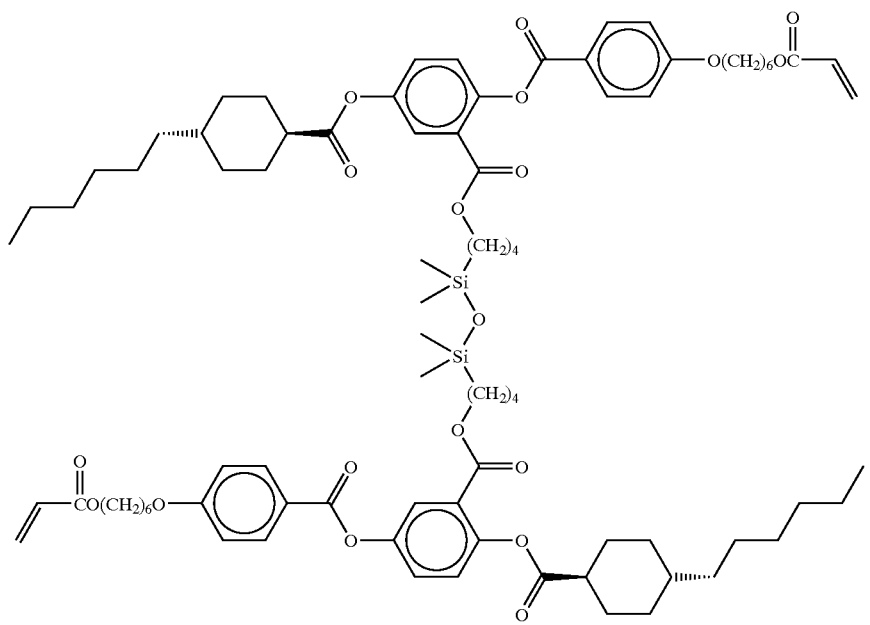
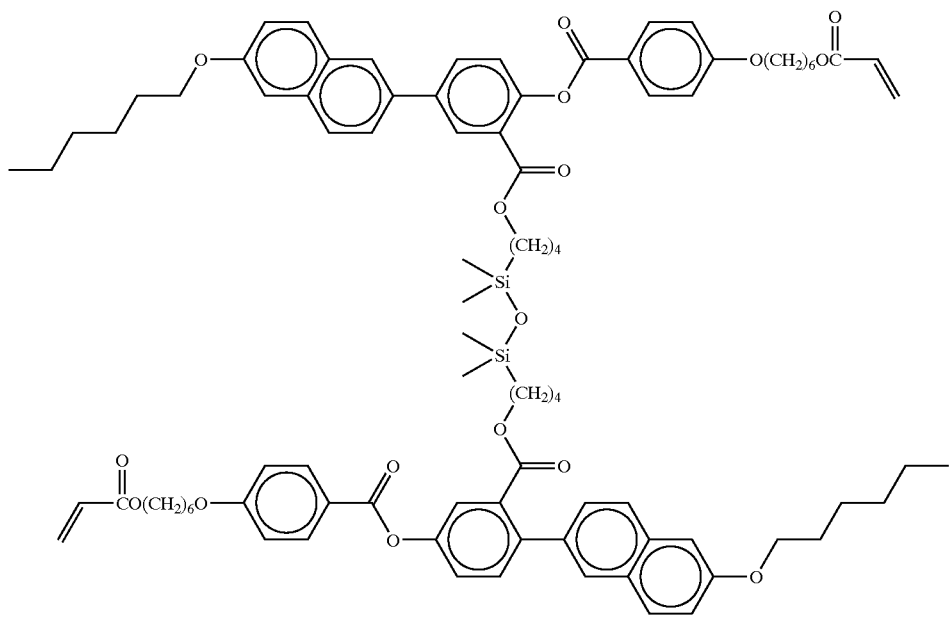

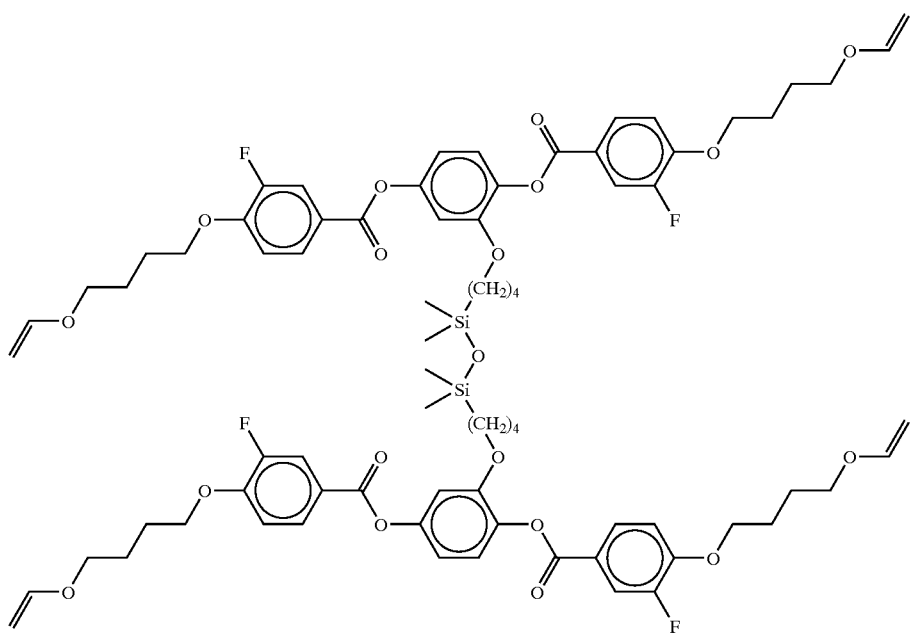
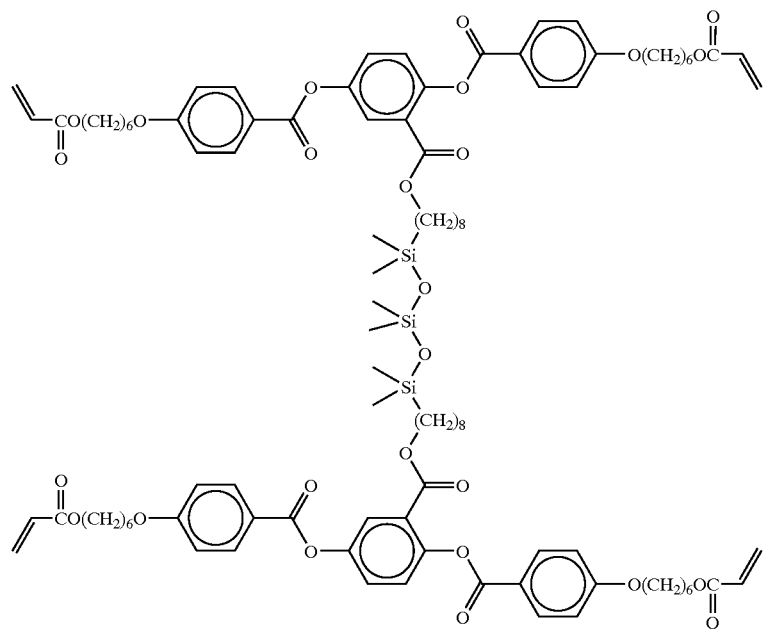

EXAMPLE 4

Preparation of Nematic LCP Films

A mixture of the following components in Anisole was prepared:

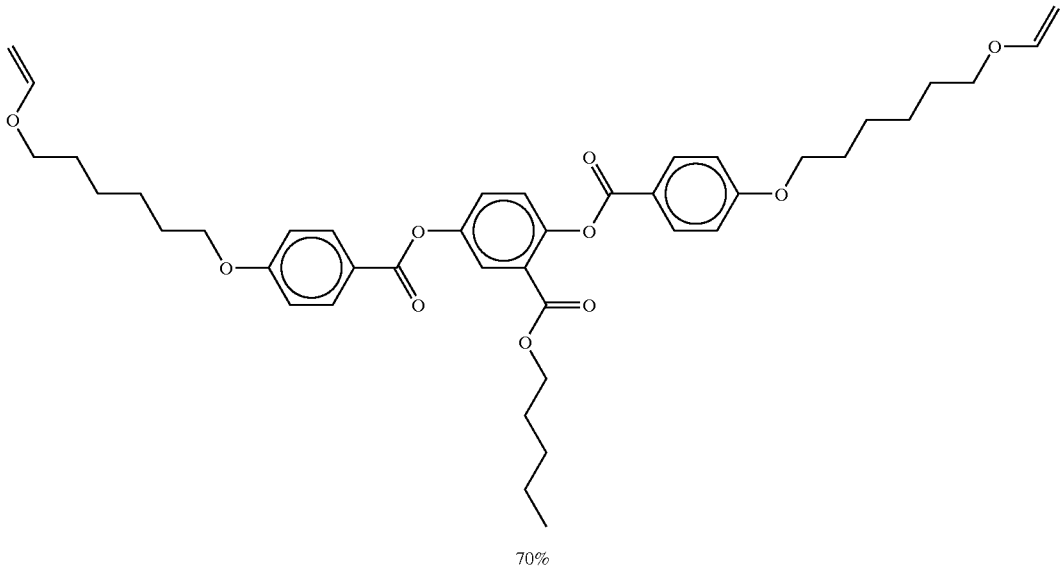

70%

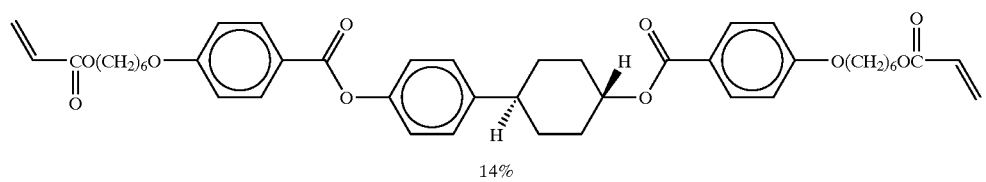

14%

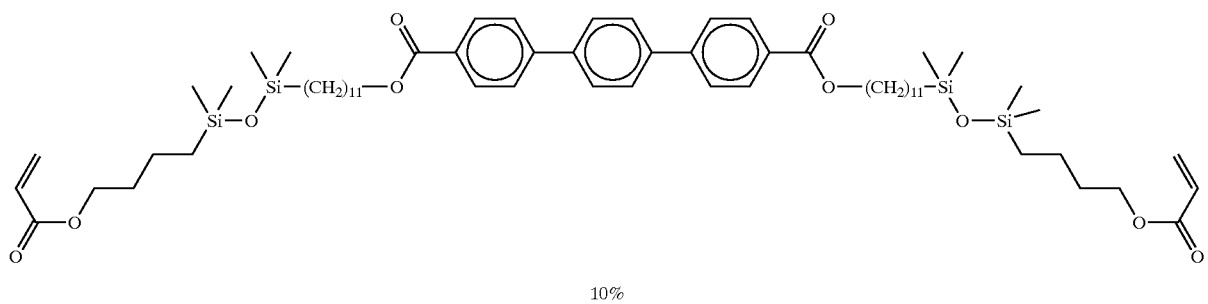

10%

1,4-butanediol diacrylate (Aldrich); and 6%

500 ppm of 2,6-di-(t-butyl)-4-hydroxytoluene (BHT) inhibitor were added to this mixture in order to prevent premature polymerization. Polymerization was started using 500 ppm initiator such as Irgacure 369 (commercially available from Ciba Geigy, Basel, Switzerland). The mixture was stirred at room temperature and then spin-coated on a glass plate having an orientation layer to form an LCP film of ca.800 nm in thickness. This film was dried at 60° C. for 1 or 2 minutes and photopolymerized by irradiation with UV light for approximately 5 minutes at room temperature in an $N_2$-atmosphere using a Mercury lamp.

The well oriented film shows the nematic mesophase at room temperature with a clearing point of 85° C. In addition this film exhibits a tilt angle of about 30° relative to the plane of the substrate, as shown by ellipsometric measurements.

EXAMPLE 5

Preparation of Nematic LCP Films

A mixture of the following components in anisole was prepared according to the procedure of Example 4:

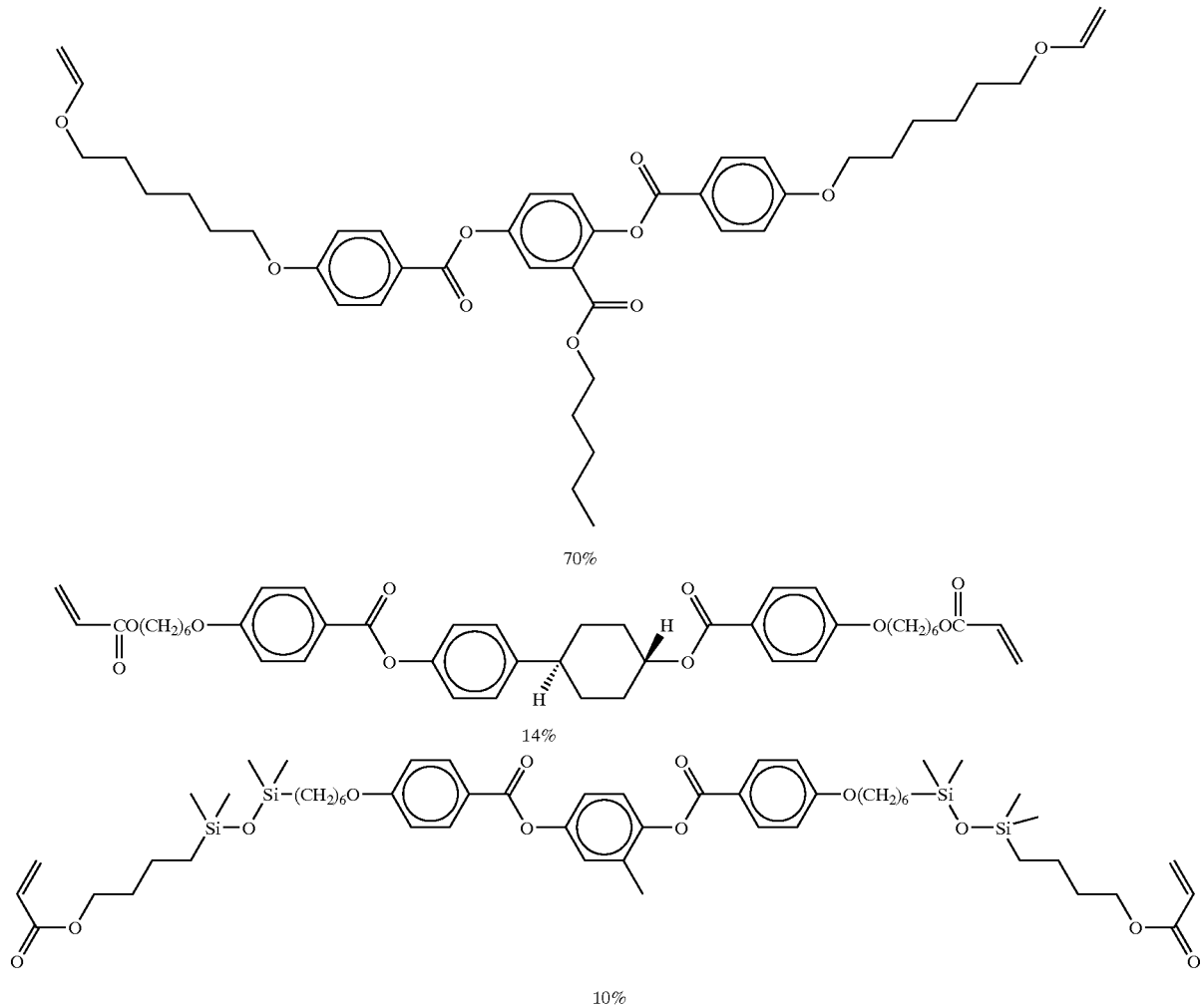

70%

14%

10%

1,4-butanediol diacrylate (Aldrich); and 6%

The well oriented film shows the nematic mesophase at room temperature with a clearing point of 86.5° C. In addition this film exhibits a tilt angle of about 30° relative to the plane of the substrate, as shown by ellipsometric measurements.

What is claimed is:

1. A method of making a liquid crystal polymer network having a stable tilt angle, which comprises orientating a layer of a polymerisable liquid crystal mixture and cross-linked the mesogenic layer to form the liquid crystal polymer network, wherein the polymerizable liquid crystal mixture comprises a component that induces a stable tilt angle in the mixture.

2. A method according to claim 1, in which the component comprises a substrate associating portion and a mesogenic extending portion, wherein the lateral dimensions of the substrate associating group are at least one and a half times as large as the lateral dimensions of the mesogenic extending group.

3. A method according to claim 2, in which the substrate associating group comprises an organosiloxane group.

4. A method according to claim 2, in which the mesogenic extending group comprises an aromatic, a non-aromatic carbocyclic or heterocyclic ring system.

5. A method according to claim 1, in which the liquid crystal polymer network is a nematic, smectic A or discotic material.

6. A compound of formula (I)

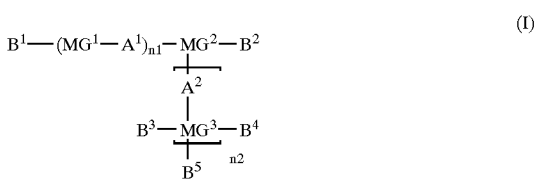

wherein $B^1$ to $B^4$ each individually represent a spacer group selected from the group comprising optionally substituted saturated or unsaturated, straight chain or branched chain $C_{1-80}$ alkyl group, one or more of the alkyl $CH_2$ groups being optionally replaced by one or more heteroatoms;

$B^5$ represents a hydrogen atom or spacer group as defined above, $A^1$ and $A^2$ each individually represent a single bond or a spacer group as defined above, $MG^1$ to $MG^3$ each individually represent a mesogenic group comprising at least one optionally substituted aromatic or non aromatic carbocyclic or heterocyclic ring systems; and n1 and n2 are each independently 0 or a positive integer with the proviso that, firstly, when n2 is 0 both $B^1$ and $B^2$ include a polymerisable group and at least one of $A^1$, $B^1$ and $B^2$ includes a group selected from an organosiloxane, an organogermanium, an organotin and an organo-perfluoro residue and secondly, when n2>0 at least one of $B^1$, $B^2$, $B^3$ and $B^4$ includes a polymerisable group and at least one of $A^1$, $A^2$, $B^1$, $B^2$, $B^3$ and $B^4$ includes an organosiloxane group.

7. A compound according to claim 6, in which at least one of $A^1$, $B^1$ and $B^2$ includes an organosiloxane group.

8. A compound according to claim 6, in which at least one of the groups B1 to B4 includes a bulky group selected from a fluorinated alkyl residue and an organic residue including an atom selected from germanium, tin and silicon.

9. A compound according to claim 8, in which the groups B1 and B2 include at least one siloxane group.

10. A compound according to claim 6, in which at least one of the groups B1 to B4 include at least one siloxane group.

11. A compound according to claim 6, in which $B^1$ to $B^4$ comprise a group of formula (II).

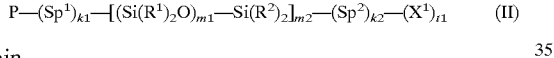

$$P-(Sp^1)_{k1}-[(Si(R^1)_2O)_{m1}-Si(R^2)_2]_{m2}-(Sp^2)_{k2}-(X^1)_{t1} \quad (II)$$

wherein

P is a polymerisable group selected from groups comprising $CH_2=CW-$, $CH_2=CW-O-$, $CH_2=CW-COO-$, $CH_2=C(Ph)-COO-$, $CH_2=CH-COO-Ph-$, $CH_2=CW-CO-NH-$, $CH_2=C(Ph)-CONH-$, $CH_2=C(COOR')-CH_2-COO-$, $CH_2=CH-O-$, $CH_2=CH-OOC-$, $Ph-CH=CH-$, $CH_3-C=N-(CH_2)_{m3}-$, $HO-$, $HS-$, $HO-(CH_2)_{m3}-$, $HS-(CH_2)_{m3}-$, $HO(CH_2)_{m3}COO-$, $HS(CH_2)_{m3}COO-$, $HWN-$, $HOC(O)-$, $CH_2=CH-Ph-(O)_{m4}$

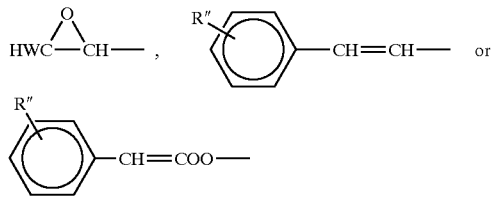

wherein

W represents H, Cl or a $C_{1-5}$ alkyl group;

m3 is an integer having a value of from 1 to 9;

m4 is an integer having a value of 0 or 1,

R' represents a $C_{1-5}$ alkyl group;

R" represents a $C_{1-5}$ alkyl group, methoxy, cyano, F, Cl, Br or I;

$Sp^1$ and $Sp^2$ each independently represent a $C_{1-20}$ alkylene, group;

k1 and k2 are integers, each independently having a value of from 0 to 4;

$R^1$ and $R^2$ each independently represent straight chain or branched $C_{1-20}$ alkyl groups;

m1 is an integer having a value of from 0 to 10;

m2 is an integer having a value of from 1 to 10;

$X^1$ represents $-O-$, $-S-$, $-NH-$, $N(CH_3)-$, $-CH(OH)-$, $-CO-$, $-CH_2(CO)-$, $-SO-$, $-CH_2(SO)-$, $-SO_2-$, $-CH_2(SO_2)-$, $-COO-$, $-OCO-$, $-OCO-O-$, $-S-CO-$, $-CO-S-$, $-SOO-$, $-OSO-$, $-SOS-$, $-CH_2-CH_2-$, $-OCH_2-$, $-CH_2O-$, $-CH=CH-$, $-C\equiv C-$ or a single bond; and t1 is an integer having a value of 0 or 1.

12. A compound according to claim 6, in which $A^1$ and/or $A^2$ comprise a group of formula (III)

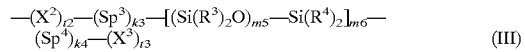

$$-(X^2)_{t2}-(Sp^3)_{k3}-[(Si(R^3)_2O)_{m5}-Si(R^4)_2]_{m6}-(Sp^4)_{k4}-(X^3)_{t3} \quad (III)$$

wherein $Sp^3$ and $Sp^4$ each independently represent a $C_{1-20}$ alkylene group, $X^2$ and $X^3$ each independently represent $-O-$, $-S-$, $-NH-$, $N(CH_3)-$, $-CH(OH)-$, $-CO-$, $-CH_2(CO)-$, $-SO-$, $-CH_2(SO)-$, $SO-$, $-CH_2(SO_2)-$, $-COO-$, $-OCO-$, $-OCO-O-$, $-S-CO-$, $-CO-S-$, $-SOO-$, $-SOS-$, $-CH_2-CH_2-$, $-OCH_2-$, $-CH_2O-$, $-CH=CH-$, $-C\equiv C-$ or a single bond, $R^3$ and $R^4$ each independently represent straight chain or branched $C_{1-20}$ alkyl groups, k3 and k4 are integers, each integer independently having a value of from 0 to 4, t2 and t3 are integers, each independently having a value of 0 or 1;

m5 is an integer having a value of from 0 to 10; and m6 is an integer having a value of from 1 to 10.

13. A compound according claim 6, in which $MG^1$ comprises a group of formula (IV)

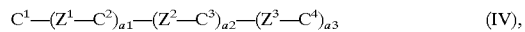

$$C^1-(Z^1-C^2)_{a1}-(Z^2-C^3)_{a2}-(Z^3-C^4)_{a3} \quad (IV),$$

wherein $C_1$ to $C_4$ each independently represent a non aromatic, aromatic, carbocyclic or heterocyclic group;

$Z^1$ to $Z^3$ each represent, independently, $-COO-$, $-OCO-$, $-CH_2-CH_2-$, $-OCH_2-$, $-CH_2O-$, $-CH=CH-$, $-C\equiv C-$, $-CH=CH-COO-$, $-OCO-CH=CH-$ or a single bond; and a1, a2 and a3 are integers, each integer independently having a value of from 0 to 3, with the proviso that a1+a2+a3<3.

14. A compound according to claim 6, in which $MG^2$ and $MG^3$ comprise a group of formula (IVa)

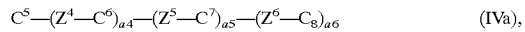

$$C^5-(Z^4-C^6)_{a4}-(Z^5-C^7)_{a5}-(Z^6-C^8)_{a6} \quad (IVa),$$

in which $C^5$, $C^6$, $C^7$ and $C^8$ each independently represent a non aromatic, aromatic, carbocyclic or heterocyclic group;

$Z^4$ to $Z^6$ each independently represent $-COO-$, $-OCO-$, $-CH_2-CH_2-$, $-OCH_2-$, $-CH_2O-$, $-CH=CH-$, $-C\equiv C-$, $-CH=CH-COO-$, $-OCO-CH=CH-$ or a single bond; and a4, a5 and a6 are integers, each integer independently having a value of from 0 to 3, with the proviso firstly that a4+a5+a6<3 and secondly that at least one of $C^5$, $C^6$, $C^7$ and $C^8$ independently comprises a trivalent group.

15. A compound of formula (I) according to claim 6,

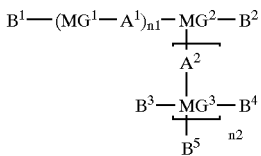

in which
n1 and n2 are integers, each independently having a value of 0 or 1;
$B^5$ is hydrogen;
$B^1$ to $B^4$ each independently represent a group of formula (V)

$$P^2-Sp^5-[(Si(CH_3)_2O)_{m7}-Si(CH_3)_2]_{m8}-Sp^6-X^4- \quad (V);$$

A1 and A2 each independently represent a group of formula (VI)

$$-X^5-Sp^7-[(Si(CH_3)_2O)_{m9}-Si(CH_3)_2]_{m10}-Sp^8-X^6- \quad (VI)$$

wherein
$X^4$ to $X^6$ each independently represent —O—, —CO—, —COO—, —OCO—, —C≡C—, or a single bond
$Sp^5$ to $Sp^8$ each independently represent a $C_{1-20}$ straight-chain alkylene group;
$P^2$ represents $CH_2=CW^5-$ or $CH_2=CW^5-(CO)_{v2}O-$ wherein $W^5$ represents H, $CH_3$, or Cl—; and v2 is an integer, having a value of 0 or 1;
m7 and m9 are integers, each integer independently having a value of 1 or 2;
m8 and m10 are integers, each integer independently having a value of 0 or 1, with the proviso that m8+m10>0;
$MG^1$ represents a group of formula IV $$C^1-(Z^1-C^2)_{a1}-(Z^2-C^3)_{a2}-(Z^3-C^4)_{a3} \quad (IV),$$

wherein
$C^1$, $C^2$, $C^3$ and $C^4$ are the same and are selected from phenylene or biphenylene; and
$Z^1$, to $Z^3$ each independently represent a single bond, —COO— or —OCO—, and
a1, a2 and a3 are integers, each integer independently having a value of from 0 to 3, with the proviso that a1+a2+a3≦3, and
$MG^2$ and $MG^3$ independently represent a group of formula IVa $$C^5-(Z^4-C^6)(Z^5-C^7)_{a5}-(Z^6-C^8)_{a6} \quad (IVa),$$

wherein
$C^5$, $C^6$, and $C^8$ are the same and are selected from phenylene or biphenylene;
$C^7$ represents phenylene or biphenylene; and
$Z^4$ to $Z^6$ each independently represent a single bond, —COO— or —OCO—, and
a4, a5 and a6 are integers, each integer independently having a value of from 0 to 3,
with the proviso firstly that a4+a5+a6<3 and secondly that at least one of $C^5$, $C^6$, $C^7$ and $C^8$ independently comprises a trivalent group.

16. A compound as claimed in claim 15, wherein $X^4$ to $X^6$ each independently represent —O—, —COO—, —OCO— or a single bond.

17. A compound as claimed in claim 15, wherein $Sp^5$ to $Sp^8$ each independently represent ethylene, propylene, butylene, pentylene, hexylene, heptylene, octylene, nonylene, decylene, undecylene, or dodecylene.

18. A compound of formula (I) as claimed in claim 6 being [1,1';4',1"]terphenyl-4,4"-dicarboxylic acid bis-{1,1-[3-(4-acryloyloxybutyl)-1,1,3,3-tetramethyldisiloxanyl]undecyl} ester.

19. A compound of formula (I) as claimed in claim 6 being 1,3-bis-{4-[2,5-di-(4-(6-acryloyloxy-hexyloxy)phenylcarbonyloxy)phenylcarbonyloxy]but-1-yl}-1,1,3,3-tetramethyldisiloxane.

20. A method for the preparation of a compound according to claim 6 comprising reacting a mesogenic compound with a direactive siloxane.

21. A liquid crystalline mixture comprising at least two components, wherein at least one component is a compound of formula (I) as defined in claim 6.

22. A liquid crystal device comprising a liquid crystalline mixture according to claim 21.

23. A liquid crystalline material comprising a compound of formula (I) as defined in claim 6 or comprising a liquid crystalline mixture which comprises at least two componenets, wherein at least one component is a compound of formula (I) as defined in claim 6.

24. A material according to claims 23, characterised in that the material is nematic, smectic A or discotic.

25. A liquid crystal device comprising a liquid crystalline material according to claim 23.

26. A liquid crystal polymer film comprising a compound of formula (I) as defined in claim 6 or comprising a liquid crystalline mixture which comprises at least two components, wherein at least one component is a compound of formula (I) as defined in claim 6.

27. A film according to claim characterised in that the film is nematic, smectic A or discotic.

28. A liquid crystal device comprising a liquid crystal polymer film according to 26.

29. A method for inducing a stable tilt angle in a liquid crystal mixture, which comprises adding to the mixture a compound as claimed in claim 6 that induces the stable tilt angle.

30. A liquid crystal device comprising a compound of formula (I) as defined in claim 6.

31. A compound of formula (I) according to claim 6, in which
n1 and n2 are both 0,
B1 and B2 each independently represent a group of formula (VII)

$$P^3-Sp^5-[Si(CH_3)_2O)_{m7}-Si(CH_3)_2]_{m8}-SP^6-X^4- \quad (VII);$$

wherein
$X^4$ represents —O—, —CO—, —COO—, —OCO—, —C≡C— or a single bond;
$Sp^5$ to $Sp^6$ each independently represent a $C_{1-20}$ straight-chain alkylene group;
$P^3$ represents a hydrogen or $CH_2-CW^5-$ or $CH_2-CW^5-(CO)_{v2}O-$wherein
$W^5$ represents H, $CH_3$, F, Cl, Br or I; and
v2 is 0 or 1;
m7 is 1 or 2;
m8 is 1;

MG² represents a group of formula IVa

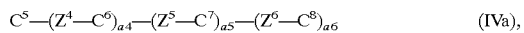

(IVa), wherein $C^5$, $C^6$, and $C^8$ are the same and are selected from phenylene or biphenylene, $C^7$ represents phenylene or biphenylene; and $Z^4$ to $Z^6$ each independently represent a single bond, —COO—, or —OCO— a4, a5 and a6 are integers, each integer independently having a value of from 0 to 3, with the proviso firstly that a4+a5+a6≦3 and secondly that at least one of $C^5$, $C^6$, $C^7$ and $C^6$ independently comprises a trivalent group.

32. A compound as claimed in claim 31, wherein $X^4$ represents —O—, —COO—, —OCO— or a single bond.

33. A compound as claimed in claim wherein $Sp^5$ to $Sp^6$ each independently represent ethylene, propylene, butylene, pentylene, hexylene, heptylene, octylene, nonylene, decylene, undecylene, or dodecylene.

34. A compound of formula (I) as claimed in claim 6 being 1,3-bis-{4-[4-oxo-4'-(6-acryloyloxy-hexyloxy)biphenyl]but-1-yl}-1,1,3,3-tetramethyldisiloxane.

35. A discotic LC material comprising one or more compounds of formula (I) according to claim 6.

* * * * *

UNITED STATES PATENT AND TRADEMARK OFFICE
CERTIFICATE OF CORRECTION

PATENT NO. : 6,749,771 B1
DATED : June 15, 2004
INVENTOR(S) : Zoubair Cherkaoui et al.

It is certified that error appears in the above-identified patent and that said Letters Patent is hereby corrected as shown below:

Column 39,
Lines 57-58, "cross-linked" should read -- cross-linking --.

Column 41,
Line 32, after "formula (II)", delete the period.
Line 61, "R'represents" should read -- R' represents --.
Line 62, "R"represents" should read -- R" represents --.
Line 65, after "alkylene", delete the comma.

Column 42,
Line 23, "SO-," should read -- $-SO_2-$, --.
Line 25, after "-SOO-," and before -- -SOS-," insert -- -OSO-, --.
Line 37, after "according", insert -- to --.
Line 42, "$C_1$ to $C_4$" should read -- $C^1$ to $C^4$ --.
Line 50, "a1+a2+a3<3." should read -- $a1+a2+a3 \leq 3$. --.
Line 54, "$C^5-(Z^4-C^6)_{a4}-(Z^5-C^7)_{a5}-(Z^6-C_8)_{a6}$" should read -- $C^5-(Z^4-C^6)_{a4}-(Z^5-C^7)_{a5}-(Z^6-C^8)_{a6}$ --
Line 56, after "in which", insert -- : --.
Line 65, "a4+a5+a6<3" should read -- $a4+a5+a6 \leq 3$ --.

Column 43,
Line 26, after "single bond", insert -- ; --.
Line 44, after "$Z^1$", delete the comma.
Line 52, "$C^5-(Z^4-C^6)(Z^5-C^7)_{a5}-(Z^6-C^8)_{a6}$" should read -- $C^5-(Z^4-C^6)_{a4}(Z^5-C^7)_{a5}-(Z^6-C^8)_{a6}$ --
Line 62, "a4+a5+a6<3" should read -- $a4+a5+a6 \leq 3$ --.
Line 63, "$C^7$ and $C^6$" should read -- $C^7$ and $C^8$ --.

Column 44,
Line 25, "componenets," should read -- components, --.
Line 27, "claims 23," should read -- claim 23, --.
Line 37, after "claim", insert -- 26, --.
Line 40, after "according to", insert -- claim --.
Line 54, "$P^3-Sp^5-[Si(CH_3)_2O]_{m7}-Si(CH_3)_2]_{m8}-Sp^6-X^4-$" should read -- $P^3-Sp^5-[Si(CH_3)_2O]_{m7}-Si(CH_3)_2]_{m8}-Sp^6-X^4-$ --.
Lines 62-63, "$CH_2-CW^5-(CO)_{v2}O$-wherein" should read -- $CH_2-CW^5-(CO)_{v2}O$- wherein --.

UNITED STATES PATENT AND TRADEMARK OFFICE
CERTIFICATE OF CORRECTION

PATENT NO. : 6,749,771 B1
DATED : June 15, 2004
INVENTOR(S) : Zoubair Cherkaoui et al.

It is certified that error appears in the above-identified patent and that said Letters Patent is hereby corrected as shown below:

Column 45,
Line 10, "OCO-a4" should read -- -OCO- a4 --.
Line 14, "$C^7$ and $C^6$" should read -- $C^7$ and $C^8$ --.

Column 46,
Line 3, after "claim", insert -- 31, --.

Signed and Sealed this

Seventh Day of December, 2004

JON W. DUDAS
*Director of the United States Patent and Trademark Office*